US012066173B2

(12) United States Patent
Feit et al.

(10) Patent No.: US 12,066,173 B2
(45) Date of Patent: *Aug. 20, 2024

(54) LIGHT EMITTING DEVICE HAVING IMPROVED ILLUMINATION AND MANUFACTURING FLEXIBILITY

(71) Applicant: FEIT ELECTRIC COMPANY, INC., Pico Rivera, CA (US)

(72) Inventors: Alan Feit, Los Angeles, CA (US); Gerardo Cisneros, Buena Park, CA (US)

(73) Assignee: FEIT ELECTRIC COMPANY, INC., Pico Rivera, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/470,914

(22) Filed: Sep. 20, 2023

(65) Prior Publication Data

US 2024/0011627 A1 Jan. 11, 2024

Related U.S. Application Data

(63) Continuation of application No. 17/988,623, filed on Nov. 16, 2022, now Pat. No. 11,796,163, which is a (Continued)

(51) Int. Cl.
*F21V 23/00* (2015.01)
*F21V 23/06* (2006.01)
(Continued)

(52) U.S. Cl.
CPC .......... *F21V 23/005* (2013.01); *F21V 23/001* (2013.01); *F21V 23/06* (2013.01); *F21V 29/70* (2015.01); *F21Y 2115/10* (2016.08)

(58) Field of Classification Search
CPC ...... F21V 23/001; F21V 23/005; F21V 23/06; F21V 29/70
See application file for complete search history.

(56) References Cited

U.S. PATENT DOCUMENTS 3,607,463 A 9/1971 Kinoshita et al.
3,871,067 A 3/1975 Bogardus et al.
(Continued)

FOREIGN PATENT DOCUMENTS

AU 07543/53 B2 11/2002
AU 07560/72 B2 1/2003
(Continued)

OTHER PUBLICATIONS

Adachi, S., "Properties of Gallium Arsenide: 18.4 Optical Funcations of AlGaAs: Tables", EMIS Datareview Series No. 2, pp. 513-528, INSPEC (IEEE, New York, 1990).
(Continued)

*Primary Examiner* — Evan P Dzierzynski
*Assistant Examiner* — Nathaniel J Lee
(74) *Attorney, Agent, or Firm* — Alston & Bird LLP

(57) ABSTRACT

Systems, methods, and apparatuses provide a light emitting device including one or more arrays of light emitting diodes attached to a first outward facing surface of a first substrate. The light emitting device further includes driver circuitry attached to a second outward facing surface of a second substrate. The light emitting device further includes a wire connection electrically coupling the first substrate and the second substrate such that the driver circuitry drives the one or more arrays of light emitting diodes. The light emitting device further includes an enclosure for housing the first substrate, the second substrate, and the wire connection.

20 Claims, 13 Drawing Sheets

Related U.S. Application Data continuation of application No. 15/930,306, filed on May 12, 2020, now Pat. No. 11,592,166.

(51) Int. Cl.
*F21V 29/70* (2015.01)
*F21Y 115/10* (2016.01)

(56) References Cited

U.S. PATENT DOCUMENTS 3,938,177 A 2/1976 Hansen et al.
3,999,280 A 12/1976 Hansen et al.
4,026,692 A 5/1977 Bartholomew
4,211,955 A 7/1980 Ray
4,497,974 A 2/1985 Deckman et al.
4,727,289 A 2/1988 Uchida
5,376,580 A 12/1994 Kish et al.
5,416,870 A 5/1995 Chun et al.
5,696,389 A 12/1997 Ishikawa et al.
5,708,280 A 1/1998 Lebby et al.
5,726,535 A 3/1998 Yan
5,775,792 A 7/1998 Wiese
5,779,924 A 7/1998 Krames et al.
5,780,867 A 7/1998 Fritz et al.
5,814,870 A 9/1998 Spaeth
5,886,401 A 3/1999 Liu
5,905,275 A 5/1999 Nunoue et al.
5,924,784 A 7/1999 Chliwnyj et al.
5,925,898 A 7/1999 Werner
5,932,048 A 8/1999 Furukawa et al.
5,952,681 A 9/1999 Chen
5,959,316 A 9/1999 Lowery
5,998,232 A 12/1999 Maruska
5,998,925 A 12/1999 Shimizu et al.
6,015,719 A 1/2000 Kish et al.
6,042,248 A 3/2000 Hannah et al.
6,066,861 A 5/2000 Hoehn et al.
6,091,085 A 7/2000 Lester
6,133,589 A 10/2000 Krames et al.
6,155,699 A 12/2000 Miller et al.
6,218,807 B1 4/2001 Sakaue et al.
6,222,207 B1 4/2001 Carter-Coman et al.
6,229,160 B1 5/2001 Krames et al.
6,252,254 B1 6/2001 Soules et al.
6,262,534 B1 7/2001 Johnson et al.
6,310,364 B1 10/2001 Uemura
6,331,063 B1 12/2001 Kamada et al.
6,335,548 B1 1/2002 Roberts et al.
6,357,889 B1 3/2002 Duggal et al.
6,369,506 B1 4/2002 Hata
6,373,188 B1 4/2002 Johnson et al.
6,376,851 B1 4/2002 Worley
6,396,082 B1 5/2002 Fukasawa et al.
6,417,019 B1 7/2002 Mueller et al.
6,452,217 B1 9/2002 Wojnarowski et al.
6,482,664 B1 11/2002 Lee et al.
6,483,196 B1 11/2002 Wojnarowski et al.
6,492,725 B1 12/2002 Loh et al.
6,495,862 B1 12/2002 Okazaki et al.
6,504,301 B1 1/2003 Lowery
6,509,584 B2 1/2003 Suzuki
6,515,308 B1 2/2003 Kneissl et al.
6,523,978 B1 2/2003 Huang
6,525,464 B1 2/2003 Chin
6,547,423 B2 4/2003 Marshall et al.
6,548,956 B2 4/2003 Forrest et al.
6,550,953 B1 4/2003 Ichikawa et al.
6,568,834 B1 5/2003 Scianna
6,569,544 B1 5/2003 Alain et al.
6,573,530 B1 6/2003 Sargent et al.
6,573,537 B1 6/2003 Steigerwald et al.
6,583,550 B2 6/2003 Iwasa et al.
6,586,882 B1 7/2003 Harbers
6,603,151 B2 8/2003 Lin et al.
6,603,258 B1 8/2003 Mueller-Mach et al.
6,607,286 B2 8/2003 West et al.
6,607,931 B2 8/2003 Streubel
6,608,333 B1 8/2003 Lee et al.
6,608,439 B1 8/2003 Sokolik et al.
6,614,058 B2 9/2003 Lin et al.
6,635,902 B1 10/2003 Lin
6,639,360 B2 10/2003 Roberts et al.
6,642,618 B2 11/2003 Yagi et al.
6,649,939 B1 11/2003 Wirth
6,657,236 B1 12/2003 Thibeault et al.
6,657,767 B2 12/2003 Bonardi et al.
6,661,167 B2 12/2003 Eliashevich et al.
6,661,578 B2 12/2003 Hedrick
6,664,571 B1 12/2003 Amann
6,674,096 B2 1/2004 Sommers
6,677,610 B2 1/2004 Choi et al.
6,682,950 B2 1/2004 Yang et al.
6,686,218 B2 2/2004 Lin et al.
6,686,676 B2 2/2004 McNulty et al.
6,709,132 B2 3/2004 Ishibashi
6,717,362 B1 4/2004 Lee et al.
6,719,936 B2 4/2004 Carlton et al.
6,729,746 B2 5/2004 Suehiro et al.
6,730,939 B2 5/2004 Eisert et al.
6,737,532 B2 5/2004 Chen et al.
6,737,681 B2 5/2004 Koda
6,746,295 B2 6/2004 Sorg
6,759,804 B2 7/2004 Ellens et al.
6,762,436 B1 7/2004 Huang et al.
6,765,236 B2 7/2004 Sakurai
6,777,871 B2 8/2004 Duggal et al.
6,784,460 B2 8/2004 Ng et al.
6,791,116 B2 9/2004 Takahashi et al.
6,791,119 B2 9/2004 Slater et al.
6,791,259 B1 9/2004 Stokes et al.
6,794,685 B2 9/2004 Hata et al.
6,803,607 B1 10/2004 Chan et al.
6,809,345 B2 10/2004 Watanabe
6,812,500 B2 11/2004 Reeh et al.
6,841,934 B2 1/2005 Wang et al.
6,844,572 B2 1/2005 Sawaki et al.
6,847,057 B1 1/2005 Gardner et al.
6,853,151 B2 2/2005 Leong et al.
6,874,910 B2 4/2005 Sugimoto et al.
6,893,890 B2 5/2005 Takekuma et al.
6,902,830 B2 6/2005 Thompson et al.
6,909,108 B2 6/2005 Tang et al.
6,914,267 B2 7/2005 Fukasawa et al.
6,914,268 B2 7/2005 Shei et al.
6,917,057 B2 7/2005 Stokes et al.
6,921,927 B2 7/2005 Ng et al.
6,922,424 B2 7/2005 Weigert et al.
6,932,495 B2 8/2005 Sloan et al.
6,936,761 B2 8/2005 Pichler
6,961,190 B1 11/2005 Tamaoki et al.
6,964,877 B2 11/2005 Chen et al.
6,969,874 B1 11/2005 Gee et al.
6,969,946 B2 11/2005 Steranka et al.
6,972,208 B2 12/2005 Hsieh et al.
6,972,212 B2 12/2005 Eisert et al.
6,972,438 B2 12/2005 Li et al.
6,982,522 B2 1/2006 Omoto
6,987,613 B2 1/2006 Pocius et al.
6,995,402 B2 2/2006 Ludowise et al.
6,997,580 B2 2/2006 Wong
6,998,281 B2 2/2006 Taskar et al.
7,008,858 B2 3/2006 Liu et al.
7,009,213 B2 3/2006 Camras et al.
7,009,217 B2 3/2006 Liu et al.
7,015,514 B2 3/2006 Baur et al.
7,018,859 B2 3/2006 Liao et al.
7,019,456 B2 3/2006 Yasukawa et al.
7,026,261 B2 4/2006 Hirose et al.
7,026,657 B2 4/2006 Bogner et al.
7,030,552 B2 4/2006 Chao et al.
7,053,419 B1 5/2006 Camras et al.
7,070,304 B2 7/2006 Imai
7,071,034 B2 7/2006 Ueda et al.
7,072,096 B2 7/2006 Holman et al.

(56) References Cited

U.S. PATENT DOCUMENTS 7,084,435 B2 8/2006 Sugimoto et al.
7,086,756 B2 8/2006 Maxik
7,091,653 B2 8/2006 Ouderkirk et al.
7,091,661 B2 8/2006 Ouderkirk et al.
7,098,589 B2 8/2006 Erchak et al.
7,102,213 B2 9/2006 Sorg
7,105,860 B2 9/2006 Shei et al.
7,119,271 B2 10/2006 King et al.
7,126,159 B2 10/2006 Itai et al.
7,129,635 B2 10/2006 Tsujimura
7,135,709 B1 11/2006 Wirth et al.
7,157,745 B2 1/2007 Blonder et al.
7,161,189 B2 1/2007 Wu
7,166,873 B2 1/2007 Okazaki
7,188,981 B2 3/2007 Rodriguez et al.
7,195,991 B2 3/2007 Karnutsch et al.
7,202,506 B1 4/2007 Denbaars et al.
7,210,806 B2 5/2007 Holman et al.
7,210,818 B2 5/2007 Luk et al.
7,217,004 B2 5/2007 Park et al.
7,223,620 B2 5/2007 Jaeger et al.
7,223,998 B2 5/2007 Schwach et al.
7,226,189 B2 6/2007 Lee et al.
7,227,304 B2 6/2007 Tsujimura et al.
7,235,817 B2 6/2007 Yano et al.
7,244,630 B2 7/2007 Krames et al.
7,250,728 B2 7/2007 Chen et al.
7,253,447 B2 8/2007 Oishi et al.
7,253,448 B2 8/2007 Roberts et al.
7,262,440 B2 8/2007 Choi et al.
7,264,378 B2 9/2007 Loh
7,268,371 B2 9/2007 Krames et al.
7,273,291 B2 9/2007 Kim et al.
7,281,818 B2 10/2007 You et al.
7,281,860 B2 10/2007 Fujita
7,282,853 B2 10/2007 Yano et al.
7,286,296 B2 10/2007 Chaves et al.
7,288,420 B1 10/2007 Yamazaki et al.
7,291,864 B2 11/2007 Weisbuch et al.
7,300,217 B2 11/2007 Mizoguchi
7,309,882 B2 12/2007 Chen
7,312,573 B2 12/2007 Chang et al.
7,317,210 B2 1/2008 Brabec et al.
7,319,246 B2 1/2008 Soules et al.
7,323,704 B2 1/2008 Itai
7,329,982 B2 2/2008 Conner et al.
7,331,697 B1 2/2008 Hulse
7,332,747 B2 2/2008 Uemura et al.
7,341,878 B2 3/2008 Krames et al.
7,344,902 B2 3/2008 Basin et al.
7,344,958 B2 3/2008 Murai et al.
7,345,298 B2 3/2008 Weisbuch et al.
7,350,936 B2 4/2008 Ducharme et al.
7,352,006 B2 4/2008 Beeson et al.
7,354,174 B1 4/2008 Yan
7,358,537 B2 4/2008 Yeh et al.
7,358,539 B2 4/2008 Venugopalan et al.
7,358,599 B2 4/2008 Ohe et al.
7,361,938 B2 4/2008 Mueller et al.
7,374,958 B2 5/2008 Pan et al.
7,380,962 B2 6/2008 Chaves et al.
7,390,117 B2 6/2008 Leatherdale et al.
7,391,153 B2 6/2008 Suehiro et al.
7,396,142 B2 7/2008 Laizure et al.
7,397,177 B2 7/2008 Takahashi et al.
7,400,439 B2 7/2008 Holman
7,408,204 B1 8/2008 Tung
7,414,270 B2 8/2008 Kim et al.
7,427,145 B2 9/2008 Jang et al.
7,431,477 B2 10/2008 Chou et al.
7,435,997 B2 10/2008 Arndt et al.
7,449,789 B2 11/2008 Chen
7,456,483 B2 11/2008 Tsukamoto et al.
7,463,419 B2 12/2008 Weber
7,465,962 B2 12/2008 Kametani et al.
7,479,662 B2 1/2009 Soules et al.
7,479,664 B2 1/2009 Williams
7,482,638 B2 1/2009 Wall, Jr.
7,489,068 B2 2/2009 Hsieh et al.
7,489,075 B2 2/2009 Lee
7,498,734 B2 3/2009 Suehiro et al.
7,504,671 B2 3/2009 Ishidu et al.
7,507,001 B2 3/2009 Kit
7,510,289 B2 3/2009 Takekuma
7,514,723 B2 4/2009 Arndt et al.
7,518,149 B2 4/2009 Maaskant et al.
7,521,782 B2 4/2009 Ishii
7,531,835 B2 5/2009 Heeger et al.
7,534,002 B2 5/2009 Yamaguchi et al.
7,534,634 B2 5/2009 Jaeger et al.
7,545,042 B2 6/2009 Yang
7,582,910 B2 9/2009 David et al.
7,585,083 B2 9/2009 Kim et al.
7,586,127 B2 9/2009 Nomura et al.
7,602,118 B2 10/2009 Cok et al.
7,626,255 B2 12/2009 Weekamp et al.
7,646,146 B2 1/2010 Cok
7,666,715 B2 2/2010 Brunner et al.
7,687,813 B2 3/2010 Nakamura et al.
7,692,205 B2 4/2010 Wang et al.
7,693,360 B2 4/2010 Shimizu et al.
7,704,763 B2 4/2010 Fujii et al.
7,710,016 B2 5/2010 Miki et al.
7,717,589 B2 5/2010 Nishioka et al.
7,719,020 B2 5/2010 Murai et al.
7,719,182 B2 5/2010 Cok et al.
7,723,740 B2 5/2010 Takashima et al.
7,733,011 B2 6/2010 Cina et al.
7,742,677 B2 6/2010 Eberhard et al.
7,745,986 B2 6/2010 Ito et al.
7,748,879 B2 7/2010 Koike et al.
7,755,096 B2 7/2010 Weisbuch et al.
7,759,140 B2 7/2010 Lee et al.
7,766,508 B2 8/2010 Villard et al.
7,772,597 B2 8/2010 Inoue
7,781,787 B2 8/2010 Suehiro et al.
7,781,789 B2 8/2010 Denbaars et al.
7,824,937 B2 11/2010 Suehiro et al.
7,842,526 B2 11/2010 Hadame et al.
7,847,302 B2 12/2010 Basin et al.
7,851,815 B2 12/2010 Diamantidis
7,860,356 B2 12/2010 Van et al.
7,868,341 B2 1/2011 Diana et al.
7,872,275 B2 1/2011 Diamantidis
7,872,414 B2 1/2011 Sugita et al.
7,875,897 B2 1/2011 Suehiro
7,932,111 B2 4/2011 Edmond
7,950,831 B2 5/2011 Moon
7,956,371 B2 6/2011 Denbaars et al.
7,964,883 B2 6/2011 Mazzochette et al.
RE42,636 E 8/2011 Chen et al.
7,994,527 B2 8/2011 Denbaars et al.
7,998,773 B2 8/2011 Abramov et al.
8,022,423 B2 9/2011 Nakamura et al.
8,035,117 B2 10/2011 Denbaars et al.
8,039,849 B2 10/2011 Lam
8,071,997 B2 12/2011 Scotch et al.
8,109,635 B2 2/2012 Allon et al.
8,158,987 B2 4/2012 Nabekura et al.
8,162,493 B2 4/2012 Skiver et al.
8,212,262 B2 7/2012 Emerson et al.
8,258,519 B2 9/2012 Hsu
8,294,166 B2 10/2012 Nakamura et al.
8,366,295 B2 2/2013 Tanda et al.
8,368,109 B2 2/2013 Iso et al.
8,378,368 B2 2/2013 Hsu et al.
8,395,167 B2 3/2013 Kang et al.
8,405,307 B2 3/2013 Yano et al.
8,455,909 B2 6/2013 Negley
8,541,788 B2 9/2013 Denbaars et al.
8,558,446 B2 10/2013 Miki et al.
8,610,145 B2 12/2013 Yano
8,637,892 B2 1/2014 Egoshi et al.
8,710,535 B2 4/2014 Jo et al.

(56) References Cited

U.S. PATENT DOCUMENTS

| | | | |
|---|---|---|---|
| 8,835,959 | B2 | 9/2014 | Nakamura et al. |
| 8,860,051 | B2 | 10/2014 | Fellows et al. |
| 8,882,290 | B2 | 11/2014 | Hsieh et al. |
| 8,889,440 | B2 | 11/2014 | Chen et al. |
| 9,016,900 | B2 | 4/2015 | Takeuchi et al. |
| 9,240,529 | B2 | 1/2016 | Demille et al. |
| 9,276,156 | B2 | 3/2016 | King et al. |
| 9,666,772 | B2 | 5/2017 | Ibbetson et al. |
| 9,705,059 | B2 | 7/2017 | Park |
| 9,752,734 | B2 | 9/2017 | Tanda et al. |
| 9,859,464 | B2 | 1/2018 | Demille et al. |
| 10,103,306 | B2 | 10/2018 | Kim |
| 10,217,916 | B2 | 2/2019 | Nakamura et al. |
| 10,312,422 | B2 | 6/2019 | Camras et al. |
| 10,374,003 | B2 | 8/2019 | Choi et al. |
| 11,592,166 | B2 * | 2/2023 | Feit ....................... F21V 23/005 |
| 11,796,163 | B2 * | 10/2023 | Feit ........................... F21K 9/23 |
| 2001/0000209 | A1 | 4/2001 | Krames et al. |
| 2001/0002049 | A1 | 5/2001 | Reeh et al. |
| 2001/0010598 | A1 | 8/2001 | Aritake et al. |
| 2001/0033135 | A1 | 10/2001 | Duggal et al. |
| 2002/0006040 | A1 | 1/2002 | Kamada et al. |
| 2002/0008452 | A1 | 1/2002 | Coushaine et al. |
| 2002/0066905 | A1 | 6/2002 | Wang et al. |
| 2002/0085601 | A1 | 7/2002 | Wang et al. |
| 2002/0123204 | A1 | 9/2002 | Torvik |
| 2002/0131726 | A1 | 9/2002 | Lin et al. |
| 2002/0141006 | A1 | 10/2002 | Pocius et al. |
| 2002/0158578 | A1 | 10/2002 | Eliashevich et al. |
| 2002/0171087 | A1 | 11/2002 | Krames et al. |
| 2003/0010975 | A1 | 1/2003 | Gibb et al. |
| 2003/0015959 | A1 | 1/2003 | Tomoda et al. |
| 2003/0031015 | A1 | 2/2003 | Ishibashi |
| 2003/0039119 | A1 | 2/2003 | Cao |
| 2003/0057444 | A1 | 3/2003 | Niki et al. |
| 2003/0057832 | A1 | 3/2003 | Juestel et al. |
| 2003/0075723 | A1 | 4/2003 | Heremans et al. |
| 2003/0100140 | A1 | 5/2003 | Lin et al. |
| 2003/0124754 | A1 | 7/2003 | Farahi et al. |
| 2003/0141506 | A1 | 7/2003 | Sano et al. |
| 2003/0151361 | A1 | 8/2003 | Ishizaka |
| 2003/0193803 | A1 | 10/2003 | Lin |
| 2003/0213969 | A1 | 11/2003 | Wang et al. |
| 2003/0215766 | A1 | 11/2003 | Fischer et al. |
| 2004/0000727 | A1 | 1/2004 | Hsu |
| 2004/0007709 | A1 | 1/2004 | Kondo |
| 2004/0007980 | A1 | 1/2004 | Shibata |
| 2004/0007981 | A1 | 1/2004 | Shibata |
| 2004/0008525 | A1 | 1/2004 | Shibata |
| 2004/0036074 | A1 | 2/2004 | Kondo |
| 2004/0037079 | A1 | 2/2004 | Luk |
| 2004/0037080 | A1 | 2/2004 | Luk et al. |
| 2004/0041161 | A1 | 3/2004 | Kim |
| 2004/0046179 | A1 | 3/2004 | Baur et al. |
| 2004/0051111 | A1 | 3/2004 | Ota et al. |
| 2004/0070014 | A1 | 4/2004 | Lin et al. |
| 2004/0075382 | A1 | 4/2004 | Stegamat et al. |
| 2004/0079408 | A1 | 4/2004 | Fetzer et al. |
| 2004/0089868 | A1 | 5/2004 | Hon et al. |
| 2004/0094772 | A1 | 5/2004 | Hon et al. |
| 2004/0095502 | A1 | 5/2004 | Losehand et al. |
| 2004/0109327 | A1 | 6/2004 | Coushaine et al. |
| 2004/0155565 | A1 | 8/2004 | Holder et al. |
| 2004/0164311 | A1 | 8/2004 | Uemura |
| 2004/0173807 | A1 | 9/2004 | Tian et al. |
| 2004/0173810 | A1 | 9/2004 | Lin et al. |
| 2004/0184495 | A1 | 9/2004 | Kondo |
| 2004/0188700 | A1 | 9/2004 | Fukasawa et al. |
| 2004/0188791 | A1 | 9/2004 | Horng et al. |
| 2004/0211970 | A1 | 10/2004 | Hayashimoto et al. |
| 2004/0212300 | A1 | 10/2004 | Chao et al. |
| 2004/0239242 | A1 | 12/2004 | Mano et al. |
| 2004/0239611 | A1 | 12/2004 | Huang et al. |
| 2004/0245531 | A1 | 12/2004 | Fuii et al. |
| 2004/0257797 | A1 | 12/2004 | Suehiro et al. |
| 2004/0263064 | A1 | 12/2004 | Huang |
| 2005/0007010 | A1 | 1/2005 | Lee |
| 2005/0029528 | A1 | 2/2005 | Ishikawa |
| 2005/0030761 | A1 | 2/2005 | Burgess |
| 2005/0032257 | A1 | 2/2005 | Camras et al. |
| 2005/0035354 | A1 | 2/2005 | Lin et al. |
| 2005/0040410 | A1 | 2/2005 | Ledentsov et al. |
| 2005/0062830 | A1 | 3/2005 | Taki et al. |
| 2005/0077532 | A1 | 4/2005 | Ota et al. |
| 2005/0082546 | A1 | 4/2005 | Lee et al. |
| 2005/0082562 | A1 | 4/2005 | Ou et al. |
| 2005/0093008 | A1 | 5/2005 | Suehiro et al. |
| 2005/0111240 | A1 | 5/2005 | Yonekubo |
| 2005/0121688 | A1 | 6/2005 | Nagai et al. |
| 2005/0133810 | A1 | 6/2005 | Roberts et al. |
| 2005/0140291 | A1 | 6/2005 | Hirakata et al. |
| 2005/0145865 | A1 | 7/2005 | Okuyama et al. |
| 2005/0156510 | A1 | 7/2005 | Chua et al. |
| 2005/0161694 | A1 | 7/2005 | Reeh et al. |
| 2005/0168987 | A1 | 8/2005 | Tamaoki et al. |
| 2005/0184300 | A1 | 8/2005 | Tazima et al. |
| 2005/0189551 | A1 | 9/2005 | Peng et al. |
| 2005/0194598 | A1 | 9/2005 | Kim et al. |
| 2005/0196887 | A1 | 9/2005 | Liu |
| 2005/0205884 | A1 | 9/2005 | Kim et al. |
| 2005/0211997 | A1 | 9/2005 | Suehiro et al. |
| 2005/0212002 | A1 | 9/2005 | Sanga et al. |
| 2005/0218790 | A1 | 10/2005 | Blumel |
| 2005/0224830 | A1 | 10/2005 | Blonder et al. |
| 2005/0237005 | A1 | 10/2005 | Maxik |
| 2005/0242734 | A1 | 11/2005 | Maxik |
| 2005/0243570 | A1 | 11/2005 | Chaves et al. |
| 2005/0248271 | A1 | 11/2005 | Ng et al. |
| 2005/0253157 | A1 | 11/2005 | Ohashi et al. |
| 2005/0253158 | A1 | 11/2005 | Yasukawa et al. |
| 2005/0265404 | A1 | 12/2005 | Ashdown |
| 2006/0000964 | A1 | 1/2006 | Ye et al. |
| 2006/0001036 | A1 | 1/2006 | Jacob et al. |
| 2006/0001186 | A1 | 1/2006 | Richardson et al. |
| 2006/0003089 | A1 | 1/2006 | Kathirgamanathan |
| 2006/0006408 | A1 | 1/2006 | Suehiro et al. |
| 2006/0008941 | A1 | 1/2006 | Haskell et al. |
| 2006/0009006 | A1 | 1/2006 | Murai et al. |
| 2006/0012299 | A1 | 1/2006 | Suehiro et al. |
| 2006/0017055 | A1 | 1/2006 | Cropper et al. |
| 2006/0038187 | A1 | 2/2006 | Ueno |
| 2006/0043399 | A1 | 3/2006 | Miyagaki et al. |
| 2006/0054905 | A1 | 3/2006 | Schwach et al. |
| 2006/0063028 | A1 | 3/2006 | Leurs |
| 2006/0082295 | A1 | 4/2006 | Chin et al. |
| 2006/0091376 | A1 | 5/2006 | Kim et al. |
| 2006/0097631 | A1 | 5/2006 | Lee |
| 2006/0118805 | A1 | 6/2006 | Camras et al. |
| 2006/0125385 | A1 | 6/2006 | Lu et al. |
| 2006/0138439 | A1 | 6/2006 | Bogner et al. |
| 2006/0145170 | A1 | 7/2006 | Cho |
| 2006/0154392 | A1 | 7/2006 | Tran et al. |
| 2006/0163586 | A1 | 7/2006 | Denbaars et al. |
| 2006/0163601 | A1 | 7/2006 | Harle et al. |
| 2006/0164836 | A1 | 7/2006 | Suehiro et al. |
| 2006/0171152 | A1 | 8/2006 | Suehiro et al. |
| 2006/0175624 | A1 | 8/2006 | Sharma et al. |
| 2006/0175625 | A1 | 8/2006 | Yokotani et al. |
| 2006/0186418 | A1 | 8/2006 | Edmond et al. |
| 2006/0186424 | A1 | 8/2006 | Fujimoto et al. |
| 2006/0189026 | A1 | 8/2006 | Cropper et al. |
| 2006/0192217 | A1 | 8/2006 | David et al. |
| 2006/0193130 | A1 | 8/2006 | Ishibashi |
| 2006/0194359 | A1 | 8/2006 | Weisbuch et al. |
| 2006/0194363 | A1 | 8/2006 | Giesberg et al. |
| 2006/0202219 | A1 | 9/2006 | Ohashi et al. |
| 2006/0202226 | A1 | 9/2006 | Weisbuch et al. |
| 2006/0234486 | A1 | 10/2006 | Speck et al. |
| 2006/0237723 | A1 | 10/2006 | Ito |
| 2006/0237732 | A1 | 10/2006 | Nagai et al. |
| 2006/0238136 | A1 | 10/2006 | Johnson et al. |
| 2006/0239006 | A1 | 10/2006 | Chaves et al. |
| 2006/0243993 | A1 | 11/2006 | Yu |
| 2006/0246722 | A1 | 11/2006 | Speck et al. |

(56) References Cited

U.S. PATENT DOCUMENTS

| | | | |
|---|---|---|---|
| 2006/0261364 A1 | 11/2006 | Suehiro et al. | |
| 2006/0267026 A1 | 11/2006 | Kim et al. | |
| 2006/0273336 A1 | 12/2006 | Fujikura et al. | |
| 2006/0273343 A1 | 12/2006 | Nakahata et al. | |
| 2006/0284195 A1 | 12/2006 | Nagai | |
| 2006/0289892 A1 | 12/2006 | Lee et al. | |
| 2006/0292747 A1 | 12/2006 | Loh | |
| 2007/0001185 A1 | 1/2007 | Lu et al. | |
| 2007/0001186 A1 | 1/2007 | Murai et al. | |
| 2007/0012940 A1 | 1/2007 | Suh et al. | |
| 2007/0018175 A1 | 1/2007 | Mazzochette et al. | |
| 2007/0019409 A1 | 1/2007 | Nawashiro et al. | |
| 2007/0029560 A1 | 2/2007 | Su | |
| 2007/0065960 A1 | 3/2007 | Fukshima et al. | |
| 2007/0085075 A1 | 4/2007 | Yamazaki et al. | |
| 2007/0085100 A1 | 4/2007 | Diana et al. | |
| 2007/0102721 A1 | 5/2007 | Denbaars et al. | |
| 2007/0120135 A1 | 5/2007 | Soules et al. | |
| 2007/0125995 A1 | 6/2007 | Weisbuch et al. | |
| 2007/0139949 A1 | 6/2007 | Tanda et al. | |
| 2007/0145397 A1 | 6/2007 | Denbaars et al. | |
| 2007/0147072 A1 | 6/2007 | Scobbo et al. | |
| 2007/0182297 A1 | 8/2007 | Drazic et al. | |
| 2007/0189013 A1 | 8/2007 | Ford | |
| 2007/0200128 A1 | 8/2007 | Yano | |
| 2007/0252164 A1 | 11/2007 | Zhong et al. | |
| 2007/0267976 A1 | 11/2007 | Bohler et al. | |
| 2007/0290224 A1 | 12/2007 | Ogawa | |
| 2008/0030691 A1 | 2/2008 | Godo | |
| 2008/0030993 A1 | 2/2008 | Narendran et al. | |
| 2008/0111146 A1 | 5/2008 | Nakamura et al. | |
| 2008/0121918 A1 | 5/2008 | Denbaars et al. | |
| 2008/0128730 A1 | 6/2008 | Fellows et al. | |
| 2008/0128731 A1 | 6/2008 | Denbaars et al. | |
| 2008/0135864 A1 | 6/2008 | David et al. | |
| 2008/0137360 A1 | 6/2008 | Van et al. | |
| 2008/0149949 A1 | 6/2008 | Nakamura et al. | |
| 2008/0149959 A1 | 6/2008 | Nakamura et al. | |
| 2008/0169752 A1 | 7/2008 | Hattori et al. | |
| 2008/0173890 A1 | 7/2008 | Sung | |
| 2008/0182420 A1 | 7/2008 | Hu et al. | |
| 2008/0191191 A1 | 8/2008 | Kim | |
| 2008/0191224 A1 | 8/2008 | Emerson et al. | |
| 2009/0078951 A1 | 3/2009 | Miki et al. | |
| 2009/0114928 A1 | 5/2009 | Messere et al. | |
| 2009/0121250 A1 | 5/2009 | Denbaars et al. | |
| 2009/0140630 A1 | 6/2009 | Kijima et al. | |
| 2009/0146170 A1 | 6/2009 | Zhong et al. | |
| 2009/0315055 A1 | 12/2009 | Tamboli et al. | |
| 2010/0046222 A1* | 2/2010 | Yang | F21K 9/278 362/249.02 |
| 2010/0059787 A1 | 3/2010 | Hoshina | |
| 2010/0090240 A1 | 4/2010 | Tamboli et al. | |
| 2010/0283078 A1 | 11/2010 | Denbaars et al. | |
| 2010/0289043 A1 | 11/2010 | Aurelien et al. | |
| 2011/0079806 A1 | 4/2011 | Hsu et al. | |
| 2011/0089455 A1 | 4/2011 | Diana et al. | |
| 2011/0101399 A1 | 5/2011 | Suehiro et al. | |
| 2011/0108863 A1 | 5/2011 | Yamazaki et al. | |
| 2011/0163681 A1 | 7/2011 | Dau et al. | |
| 2011/0193061 A1 | 8/2011 | Hsu | |
| 2011/0266555 A1 | 11/2011 | Abramov et al. | |
| 2012/0033407 A1* | 2/2012 | Barta | F21V 23/005 362/95 |
| 2012/0043568 A1 | 2/2012 | Yan et al. | |
| 2012/0161180 A1 | 6/2012 | Komatsu et al. | |
| 2014/0252396 A1 | 9/2014 | Fujii et al. | |
| 2014/0292618 A1 | 10/2014 | Yamazaki et al. | |
| 2015/0102378 A1 | 4/2015 | Huang et al. | |
| 2015/0270444 A1 | 9/2015 | Liu | |
| 2018/0158988 A1 | 6/2018 | Niki et al. | |
| 2018/0190888 A1 | 7/2018 | Kim | |
| 2019/0323666 A1 | 10/2019 | Rieder | |
| 2019/0346094 A1 | 11/2019 | Chung et al. | |
| 2023/0081514 A1 | 3/2023 | Feit et al. | |

FOREIGN PATENT DOCUMENTS

| | | | |
|---|---|---|---|
| AU | 2010257325 | A1 | 1/2011 |
| CA | 2426500 | A1 | 10/2003 |
| CN | 2831445 | Y | 10/2006 |
| DE | 19807758 | A1 | 12/1998 |
| DE | 10245932 | B3 | 2/2004 |
| DE | 102004040518 | A1 | 5/2005 |
| DE | 10361801 | A1 | 8/2005 |
| DE | 102004028143 | A1 | 1/2006 |
| DE | 112007000313 | T5 | 7/2009 |
| EP | 1081771 | A2 | 3/2001 |
| EP | 1116419 | A1 | 7/2001 |
| EP | 1207563 | A2 | 5/2002 |
| EP | 1213773 | A1 | 6/2002 |
| EP | 1225643 | A1 | 7/2002 |
| EP | 1416543 | A1 | 5/2004 |
| EP | 1429395 | A2 | 6/2004 |
| EP | 1536487 | A1 | 6/2005 |
| EP | 1603170 | A1 | 12/2005 |
| EP | 1876385 | A2 | 1/2008 |
| ES | 2338925 | T3 | 5/2010 |
| FR | 2858859 | A1 | 2/2005 |
| GB | 2345954 | A | 7/2000 |
| GB | 2371679 | A | 7/2002 |
| GB | 2413698 | A | 11/2005 |
| JP | 53-024300 | A | 3/1978 |
| JP | 02-010395 | A | 1/1990 |
| JP | 08-298345 | A | 11/1996 |
| JP | 09-006260 | A | 1/1997 |
| JP | 09-027642 | A | 1/1997 |
| JP | 09-055540 | A | 2/1997 |
| JP | 10-032351 | A | 2/1998 |
| JP | 10-200165 | A | 7/1998 |
| JP | 11-017223 | A | 1/1999 |
| JP | 11-046019 | A | 2/1999 |
| JP | 11-186590 | A | 7/1999 |
| JP | 2000-277808 | A | 10/2000 |
| JP | 2001-024223 | A | 1/2001 |
| JP | 2001-044516 | A | 2/2001 |
| JP | 3075689 | U | 2/2001 |
| JP | 2001-068731 | A | 3/2001 |
| JP | 2001-111112 | A | 4/2001 |
| JP | 2001-126515 | A | 5/2001 |
| JP | 2001-160629 | A | 6/2001 |
| JP | 2001-194232 | A | 7/2001 |
| JP | 3219000 | B2 | 10/2001 |
| JP | 2002-008735 | A | 1/2002 |
| JP | 2002-084002 | A | 3/2002 |
| JP | 2002-124589 | A | 4/2002 |
| JP | 2002-185045 | A | 6/2002 |
| JP | 2002-203991 | A | 7/2002 |
| JP | 2002-208735 | A | 7/2002 |
| JP | 2002-232020 | A | 8/2002 |
| JP | 2002-280614 | A | 9/2002 |
| JP | 2002-289925 | A | 10/2002 |
| JP | 2002-314152 | A | 10/2002 |
| JP | 2003-011417 | A | 1/2003 |
| JP | 2003-016808 | A | 1/2003 |
| JP | 2003-069085 | A | 3/2003 |
| JP | 2003-163090 | A | 6/2003 |
| JP | 2003-249692 | A | 9/2003 |
| JP | 2003-318441 | A | 11/2003 |
| JP | 2003-347586 | A | 12/2003 |
| JP | 2004-111981 | A | 4/2004 |
| JP | 2004-158557 | A | 6/2004 |
| JP | 2004-253743 | A | 9/2004 |
| JP | 2004-296575 | A | 10/2004 |
| JP | 2004-296999 | A | 10/2004 |
| JP | 2004-311677 | A | 11/2004 |
| JP | 2005-035864 | A | 2/2005 |
| JP | 2005-057310 | A | 3/2005 |
| JP | 2005-086051 | A | 3/2005 |
| JP | 2005-093102 | A | 4/2005 |
| JP | 2005-109289 | A | 4/2005 |
| JP | 2005-150261 | A | 6/2005 |
| JP | 2005-183900 | A | 7/2005 |
| JP | 2005-191197 | A | 7/2005 |
| JP | 2005-191514 | A | 7/2005 |

(56) References Cited

FOREIGN PATENT DOCUMENTS

| | | | |
|---|---|---|---|
| JP | 2005-267926 | A | 9/2005 |
| JP | 2005-268323 | A | 9/2005 |
| JP | 2005-326757 | A | 11/2005 |
| JP | 2005-347677 | A | 12/2005 |
| JP | 2005-353816 | A | 12/2005 |
| JP | 2006-024615 | A | 1/2006 |
| JP | 2006-032387 | A | 2/2006 |
| JP | 2006-041479 | A | 2/2006 |
| JP | 2006-060034 | A | 3/2006 |
| JP | 2006-128227 | A | 5/2006 |
| JP | 2006-156590 | A | 6/2006 |
| JP | 2006-165326 | A | 6/2006 |
| JP | 2006-179718 | A | 7/2006 |
| JP | 2006-191103 | A | 7/2006 |
| JP | 2006-210824 | A | 8/2006 |
| JP | 2006-229259 | A | 8/2006 |
| JP | 2006-237264 | A | 9/2006 |
| JP | 2006-245066 | A | 9/2006 |
| JP | 2006-253298 | A | 9/2006 |
| JP | 2006-261688 | A | 9/2006 |
| JP | 2006-278751 | A | 10/2006 |
| JP | 2006-278924 | A | 10/2006 |
| JP | 2006-287113 | A | 10/2006 |
| JP | 2006-294907 | A | 10/2006 |
| JP | 2006-303258 | A | 11/2006 |
| JP | 2007-165811 | A | 6/2007 |
| JP | 3970800 | B2 | 9/2007 |
| JP | 2007-311626 | A | 11/2007 |
| JP | 2007-324220 | A | 12/2007 |
| JP | 2007-324326 | A | 12/2007 |
| JP | 4076329 | B2 | 4/2008 |
| KR | 10-2002-0097420 | A | 12/2002 |
| KR | 20-0403690 | Y1 | 12/2005 |
| KR | 10-0563372 | B1 | 3/2006 |
| KR | 10-0618941 | B1 | 9/2006 |
| KR | 10-0619441 | B1 | 9/2006 |
| KR | 10-0626365 | B1 | 9/2006 |
| KR | 10-0643582 | B1 | 11/2006 |
| KR | 10-0715580 | B1 | 5/2007 |
| KR | 10-0733903 | B1 | 7/2007 |
| KR | 10-0786798 | B1 | 12/2007 |
| KR | 10-0796670 | B1 | 1/2008 |
| KR | 10-0808705 | B1 | 2/2008 |
| KR | 10-0828174 | B1 | 5/2008 |
| KR | 10-0840637 | B1 | 6/2008 |
| KR | 10-1147342 | B1 | 5/2012 |
| SG | 100618 | A1 | 12/2003 |
| TW | 586096 | B | 5/2004 |
| WO | 01/08453 | A1 | 2/2001 |
| WO | 01/29909 | A1 | 4/2001 |
| WO | 01/41512 | A1 | 6/2001 |
| WO | 01/47037 | A1 | 6/2001 |
| WO | 02/90825 | A1 | 11/2002 |
| WO | 2005/064666 | A1 | 7/2005 |
| WO | 2005/066946 | A1 | 7/2005 |
| WO | 2005/083037 | A1 | 9/2005 |
| WO | 2005/124879 | A1 | 12/2005 |
| WO | 2006/009854 | A2 | 1/2006 |
| WO | 2006/098545 | A2 | 9/2006 |
| WO | 2006/105644 | A1 | 10/2006 |
| WO | 2006/131087 | A1 | 12/2006 |
| WO | 2007/055455 | A1 | 5/2007 |

OTHER PUBLICATIONS

Atex LED How to contact us. (available at least as early as Feb. 6, 2004 at http://www.atexled.com/contact.html), p. 1, retrieved from the Internet at the Wayback Machine <https://web.archive.org/web/20040206210502/http://www.atexled.com/contact.html> on Jun. 3, 2021.

Atex LED Source Light Gallery, (available at least as early as Feb. 28, 2004 at http://www.atexled.com/gallery_source_02.html), 1 page, retrieved from the Internet at the Wayback Machine <https://web.archive.org/web/20040228040544/http://www.atexled.com/gallery_source_02.html> on Jun. 3, 2021.

Bergh, A.A., et al., (1976), "Light-Emitting Diodes", pp. 472, 510-511, and 562-563, Clarendon Press, UK.

Blackwell, Glenn R. (editor). (2000). The Electronic Packaging Handbook, 1 page, CRC Press, US.

Buffalo Courier (Aug. 29, 1909) General Electric Tungsten Lamps. Buffalo Courier, Aug. 29, 1909, pp. 1, 13, 29, retrieved from the Internet at Newspapers.com by Ancestry at <https://www.newspapers.com/image/370380744> on Dec. 16, 2020.

Bulovic, V., et al. "Transparent Light-Emitting Devices", Nature, Mar. 7, 1996, p. 29, vol. 380, Nature Research, UK.

Cambridge Dictionary of American English, 2000, pp. 48, 279, 301, 342, 343, 557, 594, 785, 786, and 928, Cambridge University Press, UK.

Chen, B. J., et al, "Transparent Organic Light-Emitting Devices with LiF/Mg: Ag Cathode", Optics Express, Feb. 7, 2005, pp. 937-941, vol. 13, Optical Society of America, US.

Cheng, Jiping, et al., Development of Translucent Aluminum Nitride (AlN) Using Microwave Sintering Process, Journal of Electroceramics, Oct. 1, 2002, pp. 67-71, vol. 9, No. 1, Kluwer Academic Publishers, Netherlands.

Chua, C.L., et al., "Dielectrically-bonded long wavelength vertical cavity laser on GaAs substrates using strain-compensated multiple quantum wells", IEEE Photonics Technology Letters, Dec. 1994, vol. 6, Issue 12, pp. 1400-1402, IEEE, US.

Cozzan, Clayton, "Monolithic translucent BaMgAl10On:Eu2+ phosphors for laser-driven solid state lighting", AIP Advances, Oct. 11, 2016, pp. 105005-1 to 105005-6, vol. 6, AIP Publishing, US.

Cozzan, Clayton, "Stable, Heat Conducting Phosphor Composites for High-Power Laser Lighting", ACS Applied Materials & Interfaces, Feb. 2018, 34 pages, American Chemical Society, US.

Craford, M. G., "LEDs Challenge the Incandescents", IEEE Circuits and Devices Magazine, Sep. 1992, vol. 8, Issue 5, pp. 24-29, IEEE, US.

Cuong, T. V., et al., "Calculation of the External Quantum Efficiency of Light Emitting Diodes with Different Chip Designs", Phys. Stat. Sol., Sep. 7, 2004, pp. 2433-2437, (c) 1, No. 10, Wiley-VCH Verlag GmbH & Co. KGaA, Germany.

Drybred, John, "Fulton renovation has modem feel but keeps Victorian look", Intelligencer Journal, Oct. 3, 1995, pp. 1-3, vol. 16, LNP Media Group Inc., US.

Forrest, Stephen, et al. (Feb. 2004). Investigations of Operational Lifetime and Modes of Failure of Organic Light Emitting Devices. United States Air Force Research Laboratory, AFRL-HE-WP-TR-2003-0154, 87 pages, U.S. Government Publishing Office, US.

Fralic, Shelley, "Rejuvenation", The Vancouver Sun, Aug. 18, 2006, pp. 1-5, Postmedia Network Inc., Canada.

Freudenrich, Craig, "How OLEDs Work", Mar. 24, 2005, retrieved from the Internet at <https://electronics.howstuffworks.comloled.htm> on Jul. 14, 2005, 7 pages.

Fujii, T., et al., "Increase in the extraction efficiency of GaN-based light-emitting diodes via surface roughening", Appl. Phys. Lett., Feb. 9, 2004, pp. 855-857, vol. 84, No. 6, American Institute of Physics, US.

Gordon, Roy G., et al., "Chemical vapor deposition of aluminum nitride thin films", Journal of Materials Research, Jul. 1992, pp. 1679-1684, vol. 7, No. 7, Materials Research Society, US.

Gove, Babcock Philip (Editor), "Webster's Third New International Dictionary of the English Language Unabridged", 2002, excerpt of 17 pages, Merriam-Webster Inc., US.

Graf, Rudolf F. (1999) Modem Dictionary of Electronics 7th Edition, pp. 270, 417-420, 422, 486, 677-678, 686, 745, 799, Newnes, Australia.

Greig, William. (2007). Integrated Circuit Packaging, Assembly and Interconnections, pp. 276-277, Springer, Germany.

Gu, G., et al., "Transparent Organic Light Emitting Devices", Applied Physics Letters, May 6, 1996, vol. 68, No. 19, pp. 2606-2608, American Institute of Physics, US.

Gu, G., et al., "Transparent Stacked Organic Light Emitting Devices. II. Device Performance and Applications to Displays", Journal of Applied Physics, Oct. 15, 1999, pp. 4076-4084, vol. 86, No. 8, American Institute of Physics, US.

(56) References Cited

OTHER PUBLICATIONS

Han, Dae-Seob, et al., "Improvement of Light Extraction Efficiency of Flip-Chip Light-Emitting Diode by Texturing the Bottom Side Surface of Sapphire Substrate", IEEE Photonics Technology Letters, Jul. 1, 2006, pp. 1406-1408, vol. 18, No. 13, IEEE, US.
Hoefler G. E., et al., "Wafer bonding of 50-mm diameter GaP to AlGaInP—GaP light-emitting diode wafers", Appl. Phys. Lett. Aug. 5, 1996, pp. 803-805, vol. 69, American Institute of Physics, US.
Interrante, Leonard V., et al., "Studies of organometallic precursors to aluminum nitride", Mat. Res. Soc. Symp. Proc., Apr. 15-19, 1986, vol. 73., pp. 359-366, Materials Research Society, U.S.
Jasinski, J., et al., "Microstructure of GaAs/GaN interfaces produced by direct wafer fusion", Applied Physics Letters, Oct. 21, 2002, pp. 3152-3154, vol. 81, No. 17, American Institute of Physics, US.
Jewell, Elizabeth, et al. (Editors), "The New Oxford American Dictionary", 2001, pp. 102,557,671,971, 1115, 1198, 1550, 1549, 1567, 1696, 1799, and 1800, Oxford University Press, US.
Johnson, Colin R. (Jan. 12, 2003) Sandia: Output/wavelength firsts for deep-UV LEDs, EE/Times, retrieved from the Internet at <https://www.eetimes.com/sandia-output-wavelength-firsts-for-deep-uv-leds/#> on Sep. 9, 2019, 3 pages.
Kish, F. A., et al., "Low-resistance Ohmic conduction across compound semiconductor wafer-bonded interfaces" Appl. Phys. Lett., Oct. 2, 1995, pp. 2060-2062, vol. 67, American Institute of Physics, US.
Kish, F. A., et al., "Very high-efficiency semiconductor wafer-bonded transparent substrate (AlxGa1-x)osinosP/GaP light-emitting diodes", Appl. Phys. Lett., May 12, 1994, pp. 2839-2841, vol. 64, American Institute of Physics, U.S.
Klages, Klages, "A Trick of the light: Designers share easy lighting tips to transform a room, and a mood", Calgary Herald, Jan. 6, 2001, pp. 1-5, Postmedia Network Inc. Canada.
Kuo, H.C., et al., (Oct. 29-Nov. 3, 2006), "Improvement in the Extraction Efficiency of AlGaInP and GaN Thin Film LEDs via N-Side Surface Roughing", 210th ECS Meeting, Abstract #1548, 2 pages, vol. 3, the Electrochemical Society, US.
Kuramoto, Nobuyuki, et al., "Translucent AlN ceramic substrate", IEEE Transactions on Components, Hybrids, and Manufacturing Technology, Dec. 1986, pp. 386-390, vol. CHMT-9, No. 4, IEEE, US.
Laplante, Phillip A. (1999) Comprehensive Dictionary of Electrical Engineering, 1999, 32 pages excerpt, including Prefaces, Forward, Editors, 6, 18, 62, 86, 213, 362, 364, and 584, CRC Press LLC, US.
Laplante, Phillip A. (2000) Electrical Engineering Dictionary CRCnetBASE, 2000, excerpt 3 pages, CRC Press LLC, US.
Lee, Chan, J., et al., "Cavity effect of transparent organic emitting device using metal cathode", Proceedings of SPIE, Sep. 8, 2004, pp. 306-313, vol. 5464, Strasbourg, France.
Lee, Song J., "Analysis ofInGaN High-Brightness Light-Emitting Diodes", Japanese Journal of Applied Physics, Nov. 1998, pp. 5990-5993, vol. 37, Issue 11, the Japan Society of Applied Physics, Japan.
Lee, Stuart M. (Editor), "Dictionary of Composite Materials Technology", 1989, pp. 62, 29, 138, and 147, Technomic Publishing Company, US.
Liau, Z.L. et al., "Wafer fusion: A novel technique for optoelectronic device fabrication and monolithic integration", Appl. Phys. Lett., Feb. 19, 1990, pp. 737-739, vol. 56, No. 8, American Institute of Physics, US.
Merriam-Webster's Collegiate Dictionary, Tenth Edition, 2000, pp. 74, 377, 412, 462, 662, 758, 759, 811, 1060, 1073, 1171, 1250, and 1251, Merriam-Webster, Incorporated, US.
Millodot, Michel, "Dictionary of Optometry and Visual Science", Seventh Edition, Aug. 25, 2009, pp. 37,191,192,204,206,231,332,351, and 389, Elsevier Limited, UK.
Murai, Akihiko, et al., "Hexagonal pyramid shaped light-emitting diodes based on ZnO and GaN direct wafer bonding" Applied Physics Letters, Oct. 26, 2006, pp. 171116-1-171116-3, vol. 89, No. 17, American Institute of Physics, US.
Murai, Akihiko, et al., "Wafer Bonding of GaN and ZnSSe for Optoelectronic Applications", Jpn. J. Appl. Phys., Sep. 10, 2004, pp. L1275-L1277, vol. 43, No. 10A, the Japan Society of Applied Physics, Japan.
Nakahara, K. et al., "Improved External Efficiency InGaN-Based Light-Emitting Diodes with Transparent Conductive Ga-Doped ZnO asp-Electrodes", Jpn. J. Appl. Phys., Jan. 9, 2004, pp. L180-L182, vol. 43, No. 2A, the Japan Society of Applied Physics, Japan.
Nakamura, Shuji, et al., "High-Brightness InGaN Blue, Green and Yellow Light-Emitting Diodes with Quantum Well Structures", Jpn. J. Appl. Phys., Jul. 1, 1995, pp. L797-L799, vol. 34, Part 2, No. 7A, the Japan Society of Applied Physics, Japan.
Narukawa, Y. et al., "Ultra-High Efficiency White Light Emitting Diodes", Jpn. J. Appl. Phys., Oct. 13, 2006, pp. L1084-L1086, vol. 45, No. 41, the Japan Society of Applied Physics, Japan.
Noctron seeks Chinese partners to make innovative LED products (Aug. 31, 2006)—News—LEDs Magazine (available at least as early as Oct. 17, 2006 as contemporaneously archived by http://web.archive.org/web/20061017131530/http://ledsmagazine.com/articles/news/3/8/23/1) retrieved on Nov. 1, 2019, 2 pages.
Orita, Kenji, et al., "High-Extraction-Efficiency Blue Light-Emitting Diode Using Extended-Pitch Photonic Crystal", Jpn. J. Appl. Phys., Aug. 25, 2004, pp. 5809-5813, vol. 43, No. 8B, the Japan Society of Applied Physics, Japan.
Oxford Dictionary of Science, Sixth Edition, 2010, p. 834, Oxford University Press, UK.
Pankove, Jacques I. and Theodore D. Moustakas (Eds.). (Oct. 1999) Gallium Nitride (GaN) II. In: R.K. Willardson and E.R. Weber (Series Eds.), Semiconductors and Semimetals, p. 339, vol. 57, Academic Press, US.
Parthasarathy, G., et al., "A Metal-Free Cathode for Organic Semiconductor Devices", Applied Physics Letters, Apr. 27, 1998, pp. 2138-2140, vol. 72, No. 17, American Institute of Physics, US.
Parthasarathy, Gautam, et al., "A Full-Color Transparent Metal-Free Stacked Organic Light Emitting Device with Simplified Pixel Biasing", Advanced Materials, Aug. 1999, vol. 11, No. 11, pp. 907-910, Wiley-VCH Verlag GmbH & Co. KGaA, Germany.
Peng, Wei Chih, et al. "Enhanced Light Output in Double Roughened GaN Light-Emitting Diodes via Various Texturing Treatments of Undoped-GaN Layer", Japanese Journal of Applied Physics, Oct. 6, 2006, pp. 7709-7712, vol. 45, No. 10A, the Japan Society of Applied Physics, Japan.
Peng, Wei Chih, et al., "Enhance the Luminance Intensity ofInGaN—GaN Light-Emitting Diode by Roughening both the p-GaN Surface and the Undoped-GaN Surface Using Wafer Bonding Methods", ECS Transactions, Jul. 26, 2006, vol. 3, No. 6, pp. 335-338, the Electrochemical Society, US.
Peng, Wei Chih, et al., "Improved Luminance Intensity ofInGaN—GaN Light-Emitting Diode by Roughening both the p-GaN Surface and the Undoped-GaN Surface", Applied Physics Letters, Jul. 26, 2006, pp. 041116-1-041116-3, vol. 89, American Institute of Physics, US.
Random House Unabridged Dictionary, Second Edition, 1993, p. 2012, Random House, Inc., US.
Random House Webster's College Dictionary, Second Edition, 1997, pp. 85, 427, 462, 515, 748, 857, 914, 1176, 1188, 1285, 1367, and 1368, Random House, Inc., US.
Schubert, E. Fred (2003), Light-Emitting Diodes, First Edition, p. 149, Cambridge University Press, UK.
Schubert, E. Fred (2006). Light Emitting Diodes. Second Edition, 8 select pages, Cambridge University Press, UK.
Schubert, E. Fred (Feb. 2018) Light Emitting Diodes, Third Edition, pp. 3-1-3-20, E. Fred Schubert, US.
Shorter Oxford English Dictionary, Sixth Edition, 2007, p. 3326, Oxford University Press, US.
Soanes, Catherine, et al. (Editors), "Oxford Dictionary of English", Second Edition, 2003, pp. 100, 101, 568, 613, 685, 998, 1147, 1231, 1605, 1606, 1623, 1762, and 1875, Oxford University Press, UK.
Stringfellow, G.B. and M.G. Crawford (Eds.). (Oct. 1997) High-brightness light-emitting diodes. In: R.K. Willardson and E.R. Weber (Series Eds.), Semiconductors and Semimetals, pp. 176-177, 338-339, vol. 48. New York: Academic Press, US.

(56) References Cited

OTHER PUBLICATIONS

Tadatomo, K. et al., "High-output power near-ultraviolet and violet light-emitting diodes fabricated on patterned sapphire substrates using metalorganic vapor phase epitaxy", in Third International Conference on Solid State Lighting, Proceedings of SPIE, Jan. 26, 2004, pp. 243-249, vol. 5187, SPIE, US.

Tadatomo, K., et al., "High Output Power loGaN Ultraviolet Light-Emitting Diodes Fabricated on Patterned Substrates Using Metalorganic Vapor Phase Epitaxy", physica status solidi (a), Nov. 22, 2001, pp. 121-125, vol. 188, No. 1, Wiley-VCH Verlag GmbH & Co. KGaA, Germany.

Tektite—Marker Lights, Lite Fire Fly products 2003 or earlier U.S., retrieved from the Internet at the Wayback Machine <https://web.archive.org/web/20001015073040/ http://tek-tite.com/Marker_Lights/marker_lights.html and https://web.archive.org/ web/20011024184816/http://tek-tite.com/Marker_Lights/marker_lights.html> on Jan. 8, 2021, 7 pages.

The American Heritage College Dictionary, Fourth Edition, 2002, pp. 91, 459, 494, 550, 790, 909, 974, 1260, 1274, 1275, 1377, and 1461, Houghton Mifflin Company, U.S.

The American Heritage Science Dictionary, First Edition, 2005, excerpt 7 pages, Houghton Mifflin Company, U.S.

The Oxford English Dictionary, Second Edition, vol. XVIII, 1989, pp. 419-420, Oxford University Press, UK.

Tummala, Rao, R., et al., (1989). Microelectronics Packaging Handbook, pp. 548-553 and 1143, Van Nostrand Reinhold, US.

Wu, Chung-Chih, et al,. "Advanced Organic Light-Emitting Devices for Enhancing Display Performances", Journal of Display Technology, Dec. 2005, pp. 248-266, vol. 1, No. 2, IEEE, US.

Yamada, Motokazu, et al., "InGaN-Based Near-Ultraviolet and Blue-Light-Emitting Diodes with High External Quantum Efficiency Using a Patterned Sapphire Substrate and a Mesh Electrode", Jpn. J. Appl. Phys., Dec. 15, 2002, pp. L1431-L1433, Part 2, vol. 12B, the Japan Society of Applied Physics, Japan.

Zhu, Furong, et al., "Toward Novel Flexible Display-Top-Emitting OLEDs on A1-Laminated PET Substrates", Proceedings of the IEEE, Aug. 8, 2005, pp. 1440-1446, vol. 93, No. 8, IEEE, US.

Zukauskas, Arturas, et al., "Chapter 1: A Historical Introduction", Introduction to Solid-State Lighting, Apr. 18, 2002, 14 pages, John Whiley & Sons, Inc., US.

* cited by examiner

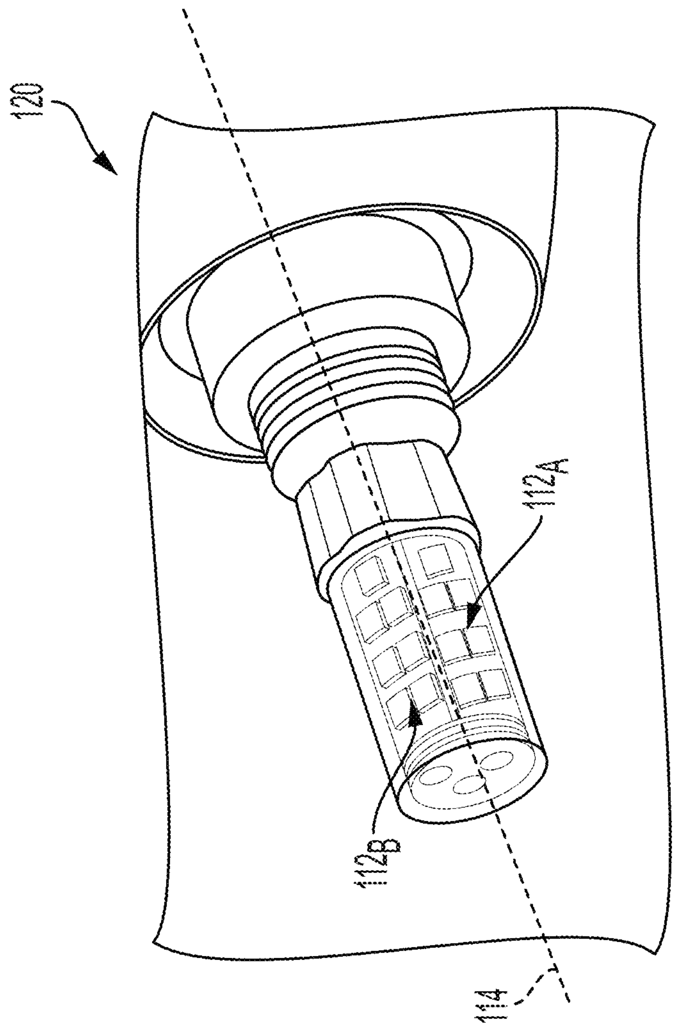
FIG. 1B
PRIOR ART
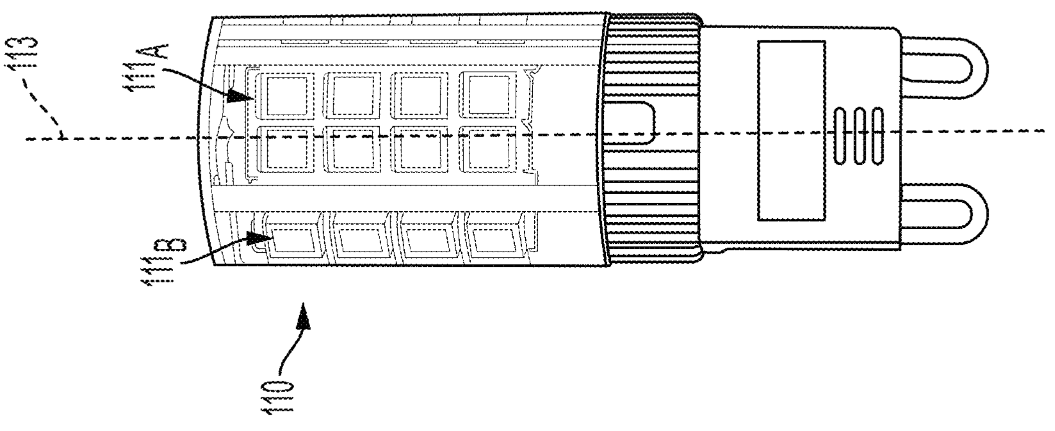

LIGHT EMITTING DEVICE HAVING IMPROVED ILLUMINATION AND MANUFACTURING FLEXIBILITY

CROSS-REFERENCE TO RELATED APPLICATION

The present application is a continuation of U.S. patent application Ser. No. 17/988,623, filed Nov. 16, 2022, which is a continuation of U.S. Nonprovisional application Ser. No. 15/930,306, filed May 12, 2020, now U.S. Pat. No. 11,592,166; the entire contents of which are hereby incorporated by reference herein.

BACKGROUND

Light emitting devices may comprise light emitting diodes. Light emitting diodes (also referred to herein as LEDs) are semiconductor devices that emit light when an electric current is passed through them. The light is produced when particles that carry the electric current (i.e., electrons and holes) combine together with the semiconductor material of the semiconductor devices. LEDs are described as solid-state devices, which distinguishes them from other lighting technologies that use heated filaments or gas discharge as lighting sources (e.g., incandescent, tungsten halogen lamps; fluorescent lamps). For lighting applications, LED die are typically incorporated in packages that provide reflector structure, electrical connections, thermal connections, and light conversion phosphor.

LEDs are widely used in lighting applications for residential and commercial structures. Light bulbs utilizing LEDs are far more efficient when compared to traditional lighting such as incandescent and fluorescent lights. Most of the energy in LEDs is converted into light and a minimal amount results in heat.

Through applied effort, ingenuity, and innovation many deficiencies of such systems have been solved by developing solutions that are in accordance with the embodiments of the present invention, many examples of which are described in detail herein.

SUMMARY

Embodiments of the present disclosure provide a light emitting device including one or more arrays of light emitting diodes attached to a first outward facing surface of a first substrate. The light emitting device further includes driver circuitry attached to a second outward facing surface of a second substrate. The light emitting device further includes a wire connection electrically coupling the first substrate and the second substrate such that the driver circuitry drives the one or more arrays of light emitting diodes. The light emitting device further includes an enclosure for housing the first substrate, the second substrate, and the wire connection.

In embodiments, one or more of the first substrate or the second substrate comprises sapphire. In embodiments, the light emitting device further includes an outer layer of phosphor outside the first outward facing surface of the first substrate and the second outward facing surface of the second substrate.

In embodiments, the light emitting device further includes a ceramic base.

In embodiments, the light emitting device further includes one or more of an Edison base, an E11 base, a G4 base, a G8 base, a G9 base, a Wedge base, a Bayonet base, or a DC Bayonet base.

In embodiments, the light emitting device is configured for emitting light in one or more of a wall fixture, a step light, a mini pendant light, a decorative sconce light, a desk lamp, or an outdoor fixture.

In embodiments, the enclosure is one or more of clear, opaque, shatterproof, glass, or plastic.

In embodiments, the enclosure is filled with gas for cooling the LED arrays. In embodiments, the first substrate and the second substrate are surrounded by a phosphor layer.

In embodiments, the light emitting device further includes a plurality of LED arrays attached to the first outward facing surface of the first substrate.

This Summary does not attempt to completely signify any particular innovation, embodiment, or example as it can be used in commerce. Additionally, this Summary is not intended to signify essential elements of an innovation, embodiment or example or to limit the scope of the subject matter of this disclosure.

The innovations, embodiments, and/or examples found within this disclosure are not all-inclusive, but rather describe the basic significance of the subject matter. Accordingly, one use of this Summary is as a prelude to a Detailed Description presented later.

BRIEF DESCRIPTION OF THE DRAWINGS

The following Detailed Description, Figures, and appended Claims signify the nature and advantages of the innovations, embodiments and/or examples of the claimed inventions. All of the Figures signify innovations, embodiments, and/or examples of the claimed inventions for purposes of illustration only and do not limit the scope of the claimed inventions. Such Figures are not necessarily drawn to scale, and are part of the Disclosure.

In the Figures, similar components or features may have the same, or similar, reference signs in the form of labels (such as alphanumeric symbols, e.g., reference numerals), and may signify similar or equivalent functionality. Further, various components of the same type may be distinguished by following the reference label by a dash and a second label that distinguishes among the similar components. If only the first reference label is used in the specification, the description is applicable to any one of the similar components having the same first reference label irrespective of the second reference label. A brief description of the Figures is below.

FIG. 1B illustrates an exemplary conventional light emitting device;

In such various figures, reference signs may be omitted as is consistent with accepted engineering practice; however, one of ordinary skill in the art will understand that the illustrated components are readily understood when viewed in context of the illustration as a whole and the accompanying disclosure describing such various figures.

DETAILED DESCRIPTION

The Figures and the following Detailed Description signify innovations, embodiments and/or examples by way of illustration only, with various features, structures or characteristics described together in a single embodiment to streamline the disclosure. Variations of any of the elements, processes, machines, systems, manufactures or compositions disclosed by such exemplary innovations, embodiments and/or examples will be readily recognized and may be used in commerce without departing from the principles of what is claimed. The Figures and Detailed Description may also signify, implicitly or explicitly, advantages and improvements of a subset of the exemplary embodiments described herein.

In the Figures and Detailed Description, numerous specific details may be described to enable one or more of the exemplary innovations, embodiments and/or examples. In the interest of not obscuring the presentation of the exemplary innovations, embodiments and/or examples in the following Detailed Description, some processing steps or operations that are known in the art may be combined together for presentation and for illustration purposes and might not be described in detail. However, a person skilled in the art will recognize that these exemplary innovations, embodiments and/or examples may be used in commerce without these specific details or with equivalents thereof. In other instances, well-known processes and devices are not described in detail as not to unnecessarily obscure aspects of these exemplary innovations, embodiments and/or examples. In other instances, some processing steps or operations that are known in the art may not be described at all. Instead, the following description is focused on the distinctive features or elements of various exemplary innovations, embodiments and/or examples. Furthermore, while this description may refer to some components of the structure in the singular tense, more than one component may be depicted throughout the Figures and like components are labeled with like numerals.

Conventional small halogen light bulbs are being replaced by what are referred to as G9 LED bulbs due to the significant energy savings afforded by the LED bulbs. The term G9 refers to the base of the bulb, whereby the bulb is connected to a socket or light fixture. G9 LED bulbs (and the small halogen light bulbs they replace) comprise what is called two bi-pin connections for connecting to a light fixture. Other LED replacements for small halogen or incandescent light bulbs include those having a variety of base types (e.g., Edison (e.g., E10, E11, E26), G4, G6.35, GY6.35, and the like).

Figure 1A:
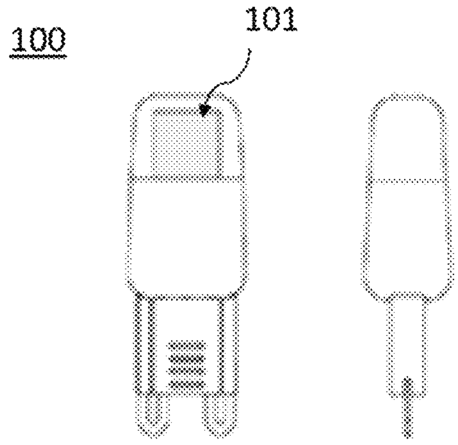
FIG. 1A PRIOR ART
FIG. 1A illustrates an exemplary conventional light emitting device.

As shown in FIG. 1A, conventional designs for G9 and other LED bulbs typically comprise components including a single circuit board (or substrate) having an array of LEDs on a single surface of the single circuit board (or substrate) as well as control circuitry (not shown) on the same single circuit board or substrate. That is, a light bulb 100 includes a single circuit board 101 having an array of LEDs on a single surface of the circuit board 101. The light bulb 100 further includes control circuitry for the array of LEDs on the single surface of the circuit board 101 as well. In such conventional designs, the light emitted from the single surface does not spread out in a desired manner for most lighting applications.

Shown in FIG. 1B, in other conventional designs (e.g., 110, 120), the components include multiple single circuit boards (e.g., $\mathbf{111}_A$, $\mathbf{111}_B$, $\mathbf{112}_A$, $\mathbf{112}_B$) arranged in a hexagonal arrangement or other arrangement whereby the singular circuit boards are placed alongside one another and positioned around an axis (e.g., 113, 114). These singular circuit boards also include driver circuitry (not shown) for the individual LED arrays contained thereon as well. Manufacturing of such conventional designs is costly and complex considering the required arrangement of the driver circuitry in order to support each of the individual LED arrays and circuit boards in the appropriate locations.

Embodiments of the present disclosure overcome the aforementioned and other problems by providing a light emitting device (e.g., LED light bulb) comprising a first substrate or circuit board comprising one or more arrays of LEDs arranged on an outward facing surface of the substrate or circuit board, and a second substrate where the driver circuitry for the one or more arrays of LEDs is situated. In this manner, uniformly emitted light is provided, and manufacturing complexity is reduced. In embodiments, one or more of the first substrate or the second substrate comprises sapphire or ceramic material.

In embodiments, the first substrate and the second substrate may be connected via a singular wire connection such that the driver circuitry drives the one or more arrays of LEDs.

In embodiments, the light emitting device comprises a layer of phosphor surrounding the outward facing surfaces of each of the first substrate and the second substrate.

Embodiments of the present disclosure may include one or more of an Edison base, an E11 base, a G4 base, a G8 base, a G9 base, a Wedge base, a Bayonet base, or a DC Bayonet base. It will be appreciated that other base types may be used in conjunction with embodiments described herein without departing from the scope of the disclosure.

Figure 2C:
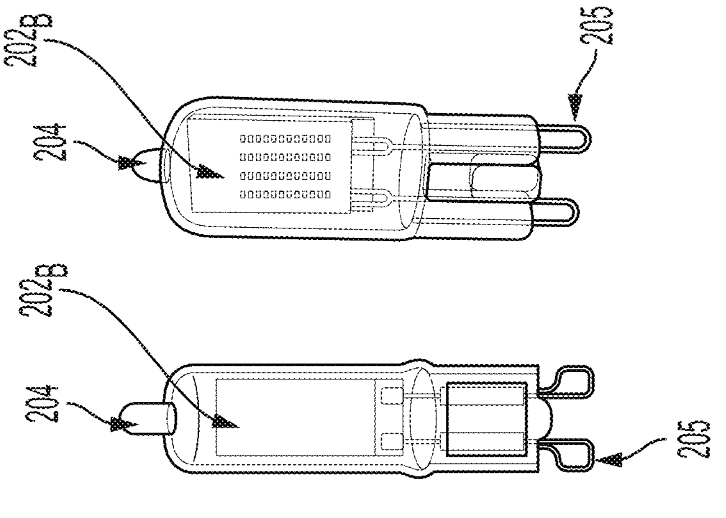
FIG. 2C illustrates an exemplary light emitting device configured in accordance with embodiments of the present disclosure.
Figure 2B:
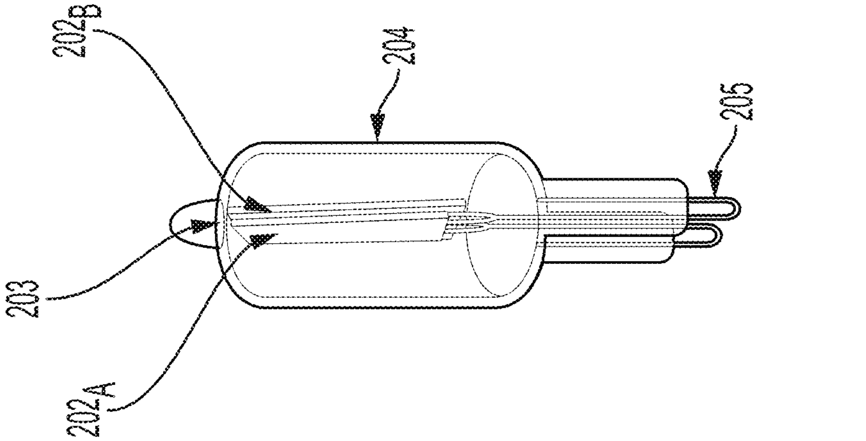
FIG. 2B illustrates an exemplary light emitting device configured in accordance with embodiments of the present disclosure.
Figure 2A:
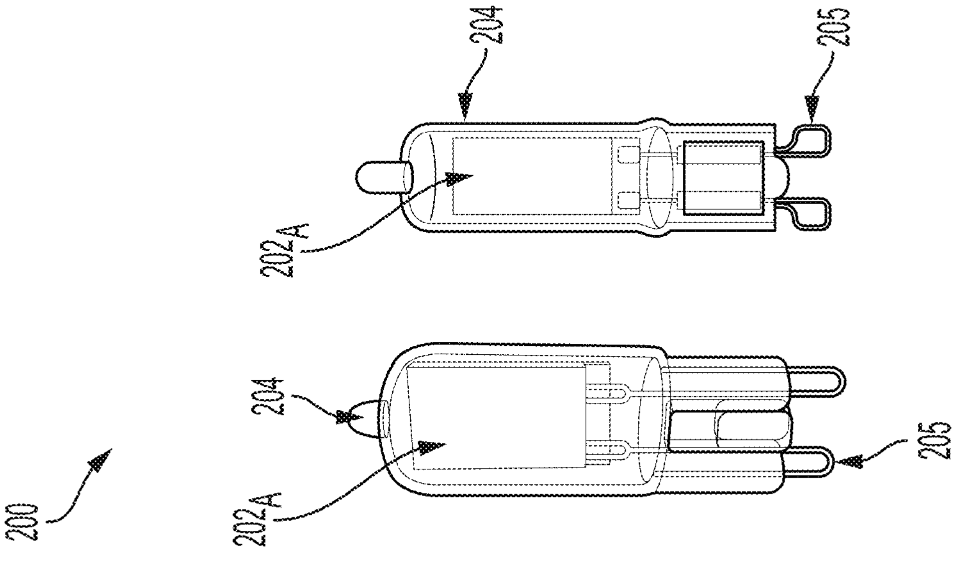
FIG. 2A illustrates an exemplary light emitting device configured in accordance with embodiments of the present disclosure.

FIGS. 2A-2C illustrate an exemplary light emitting device 200 configured in accordance with embodiments of the present disclosure. In embodiments, an exemplary light emitting device 200 comprises a first LED array $\mathbf{202}_A$ on a first surface of a first substrate. The exemplary light emitting device 200 further comprises driver circuitry $\mathbf{202}_B$ on a second surface of a second substrate. The first surface of the first substrate and the second surface of the second substrate may be positioned opposite one another such that the first surface is facing outward in a first direction and the second surface is facing outward in a second direction that is 180 degrees from the first direction (i.e., the first surface is forward facing and the second surface is rear facing). The first surface and the second surface may be separated by an additional substrate layer 203. The additional substrate layer 203 may comprise sapphire or ceramic material.

The first LED array $\mathbf{202}_A$, the driver circuitry $\mathbf{202}_B$, and the optional additional substrate layer 203 are housed in an enclosure 204 (e.g., a glass, plastic, clear, opaque, transparent and/or shatterproof bulb). In embodiments, the enclosure 204 is filled with a gas that serves as a cooling system for the first LED array $\mathbf{202}_A$. It will be appreciated that first LED array $\mathbf{202}_A$ may comprise a plurality of LED arrays. In embodiments, the first substrate and the second substrate may be connected via a singular wire connection such that the driver circuitry drives the one or more arrays of LEDs.

In embodiments, the first LED array $\mathbf{202}_A$ and the driver circuitry $\mathbf{202}_B$ are surrounded by a phosphor layer (not shown). The light emitting device 200 comprises connections 205 for insertion into a lighting socket or fixture (e.g., G9 base application).

Figures 3A, 3B, 3C:
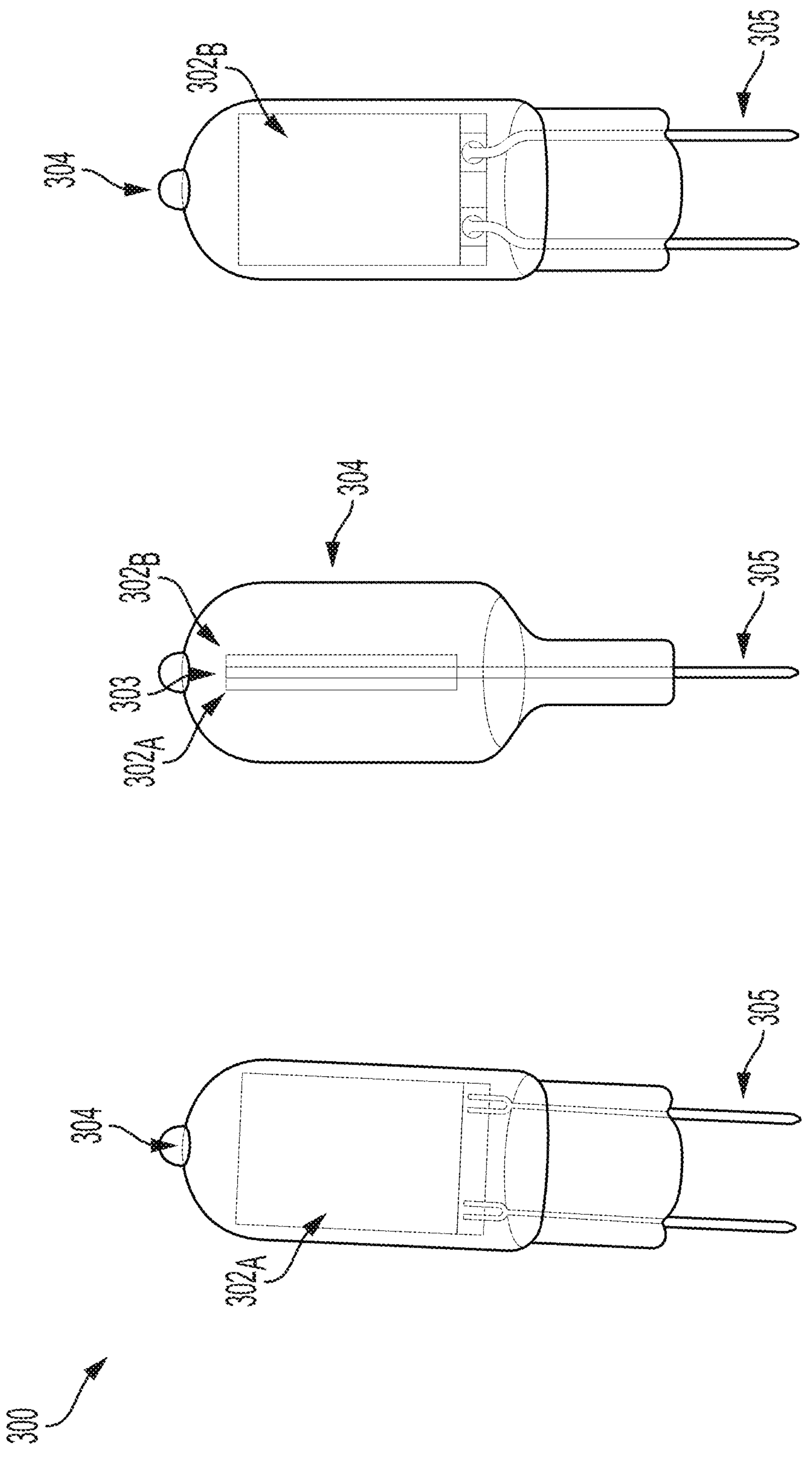
FIG. 3A illustrates an exemplary light emitting device configured in accordance with embodiments of the present disclosure.
FIG. 3B illustrates an exemplary light emitting device configured in accordance with embodiments of the present disclosure.
FIG. 3C illustrates an exemplary light emitting device configured in accordance with embodiments of the present disclosure.

FIGS. 3A-3C illustrate an exemplary light emitting device 300 configured in accordance with embodiments of the present disclosure. In embodiments, an exemplary light emitting device 300 comprises a first LED array $\mathbf{302}_A$ on a first surface of a first substrate. The exemplary light emitting device 300 further comprises driver circuitry $\mathbf{302}_B$ on a second surface of a second substrate. In embodiments, the first substrate and the second substrate may be connected via a singular wire connection such that the driver circuitry drives the one or more arrays of LEDs.

The first surface of the first substrate and the second surface of the second substrate may be positioned opposite one another such that the first surface is facing outward in a first direction and the second surface is facing outward in a second direction that is 180 degrees from the first direction (i.e., the first surface is forward facing and the second surface is rear facing). The first surface and the second surface may be separated by an additional substrate layer 303. The additional substrate layer 303 may comprise sapphire or ceramic material.

The first LED array $\mathbf{302}_A$, the driver circuitry $\mathbf{302}_B$, and the optional additional substrate layer 303 are housed in an enclosure 304. The enclosure may be glass, plastic, shatterproof, transparent, clear, opaque, or the like. In embodiments, the enclosure 304 is filled with a gas that serves as a cooling system for the first LED array $\mathbf{302}_A$. It will be appreciated that first LED array $\mathbf{302}_A$ may comprise a plurality of LED arrays.

In embodiments, the first LED array $\mathbf{302}_A$ and the driver circuitry $\mathbf{302}_B$ are surrounded by a phosphor layer (not shown). The light emitting device 300 comprises connections 305 for insertion into a lighting socket or fixture (e.g., GY6.35 base application).

Figure 4C:
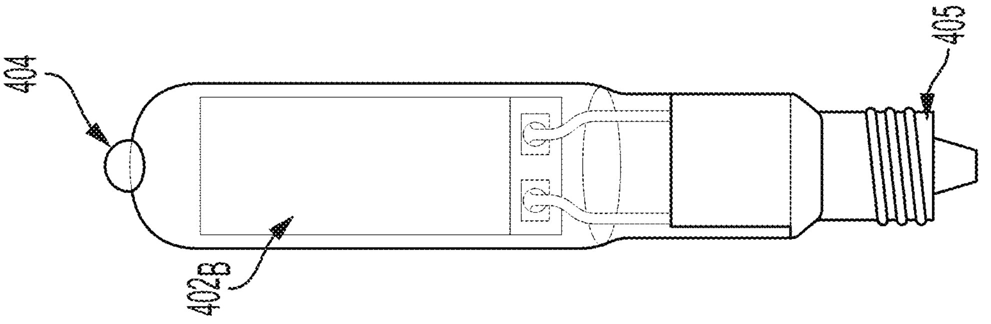
FIG. 4C illustrates an exemplary light emitting device configured in accordance with embodiments of the present disclosure.
Figure 4B:
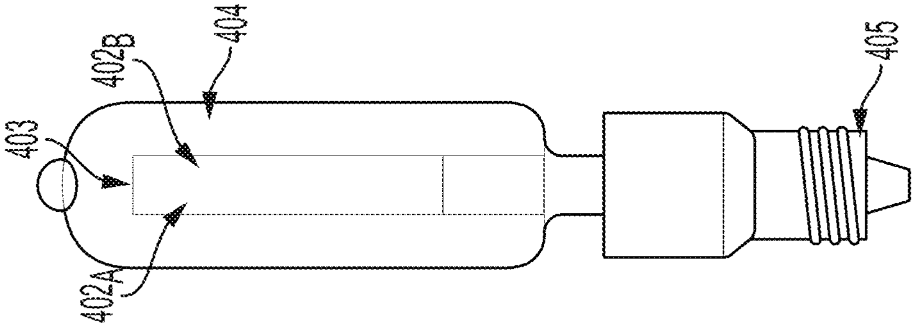
FIG. 4B illustrates an exemplary light emitting device configured in accordance with embodiments of the present disclosure.
Figure 4A:
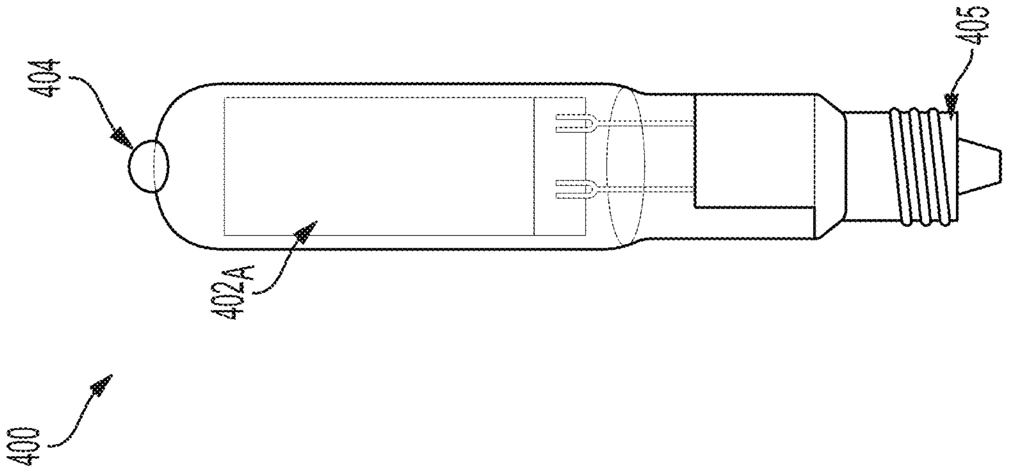
FIG. 4A illustrates an exemplary light emitting device configured in accordance with embodiments of the present disclosure.

FIGS. 4A-4C illustrate an exemplary light emitting device 400 configured in accordance with embodiments of the present disclosure. In embodiments, an exemplary light emitting device 200 comprises a first LED array $\mathbf{402}_A$ on a first surface of a first substrate. The exemplary light emitting device 400 further comprises driver circuitry $\mathbf{402}_B$ on a second surface of a second substrate. In embodiments, the first substrate and the second substrate may be connected via a singular wire connection such that the driver circuitry drives the one or more arrays of LEDs.

The first surface of the first substrate and the second surface of the second substrate may be positioned opposite one another such that the first surface is facing outward in a first direction and the second surface is facing outward in a second direction that is 180 degrees from the first direction (i.e., the first surface is forward facing and the second surface is rear facing). The first surface and the second surface may be separated by an additional substrate layer 403. The additional substrate layer 403 may comprise sapphire or ceramic material.

The first LED array $\mathbf{402}_A$, the driver circuitry $\mathbf{402}_B$, and the optional additional substrate layer 203 are housed in an enclosure 404. The enclosure may be glass, plastic, shatterproof, transparent, clear, opaque, or the like. In embodiments, the enclosure 404 is filled with a gas that serves as a cooling system for the first LED array $\mathbf{402}_A$. It will be appreciated that first LED array $\mathbf{402}_A$ may comprise a plurality of LED arrays.

In embodiments, the first LED array $\mathbf{402}_A$ and the driver circuitry $\mathbf{402}_B$ are surrounded by a phosphor layer (not shown). The light emitting device 400 comprises connections 405 for insertion into a lighting socket or fixture (e.g., E11 base/mini candelabra application).

Figure 5A:
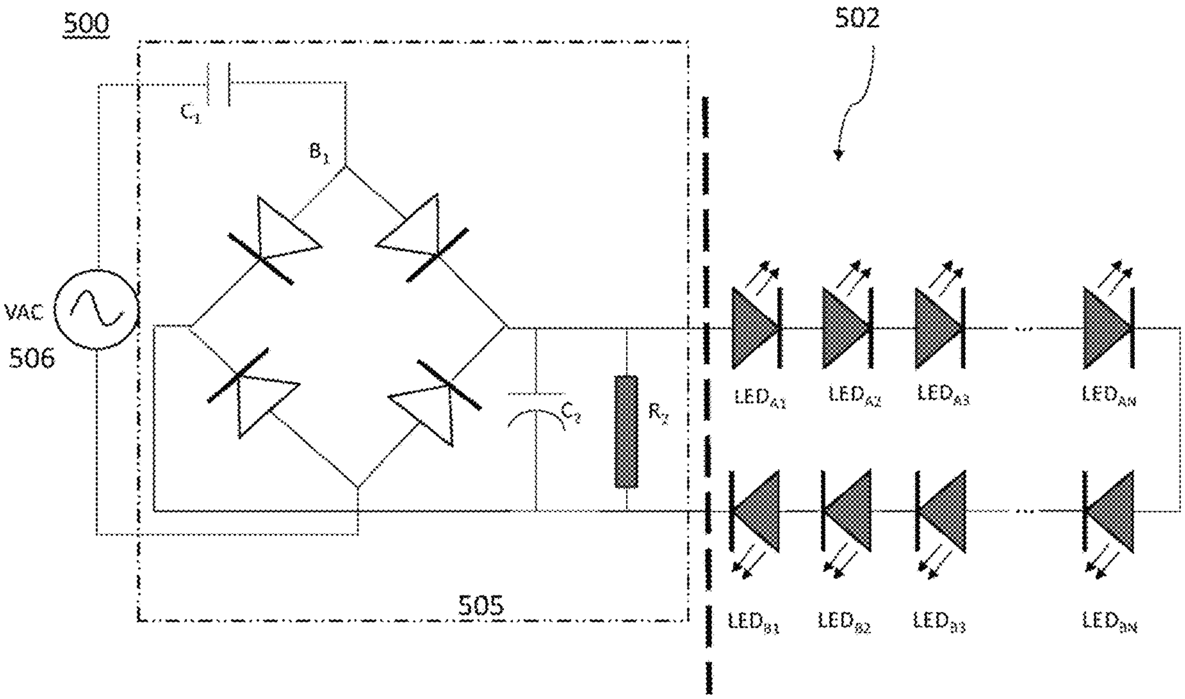
FIG. 5A illustrates an exemplary schematic of an exemplary light emitting device for use with embodiments of the present disclosure.
Figure 5B:
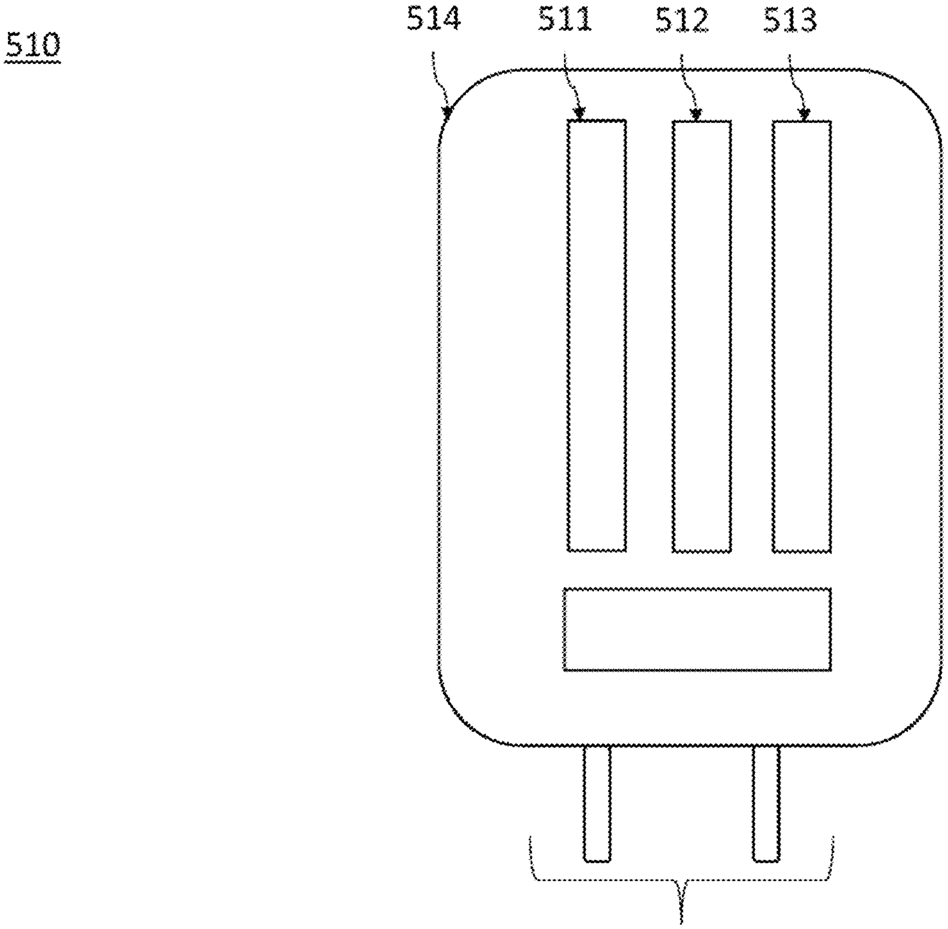
FIG. 5B illustrates an exploded view of an exemplary light emitting device for use with embodiments of the present disclosure.

FIG. 5A illustrates an exemplary schematic of an exemplary light emitting device 500, for use with embodiments of the present disclosure. FIG. 5B illustrates an exploded view of the exemplary light emitting device 500 for use with embodiments of the present disclosure. In embodiments, the exemplary light emitting device 500 comprises a first LED array 511 (e.g., 502 of FIG. 5A) on a first surface of a first substrate, and control circuitry 513 (e.g., 505 of FIG. 5A). In embodiments, the first LED array 511 (e.g., 502 of FIG. 5A) comprises a first plurality of LEDs (e.g., $LED_{A1}$, $LED_{A2}$, $LED_{A3}$, $LED_{B1}$, $LED_{B2}$, $LED_{B3}$, etc.) connected in series. An electrical coupling (not shown) connects the first plurality of LEDs with the control circuitry. The first LED array 511 may comprise a plurality of LED arrays, in embodiments. In embodiments, the first substrate and the second substrate may be connected via a singular wire connection such that the driver circuitry drives the one or more arrays of LEDs.

The first surface of the first substrate and the second surface of the second substrate are positioned opposite one another such that the first surface is facing outward in a first direction and the second surface is facing outward in a second direction that is 180 degrees from the first direction (i.e., the first surface is forward facing and the second surface is rear facing). The first substrate and the second substrate are separated by an optional additional substrate layer 512. The first LED array 511, the optional additional substrate layer 512, the control circuitry 513 (e.g., circuitry 505 of FIG. 5A) supporting them are housed in an enclosure 514. The enclosure may be glass, plastic, shatterproof, transparent, clear, opaque, or the like. The light emitting device 510 comprises connections 516 for insertion into a lighting socket or fixture (e.g., to electrically couple with a voltage source such as VAC 506 of FIG. 5A). The enclosure 514 may be filled with a gas for cooling the LEDs. The first substrate and second substrate may be surrounded by a phosphor layer.

Figure 6A:
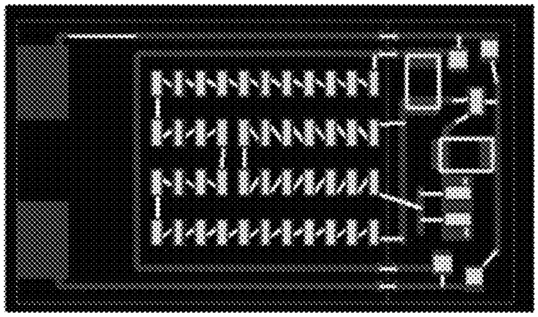
FIGS. 6A and 6B illustrate an exemplary PCB layout for an exemplary light emitting device according to embodiments, as well as an exemplary schematic for an exemplary light emitting device according to embodiments.
Figure 6B:
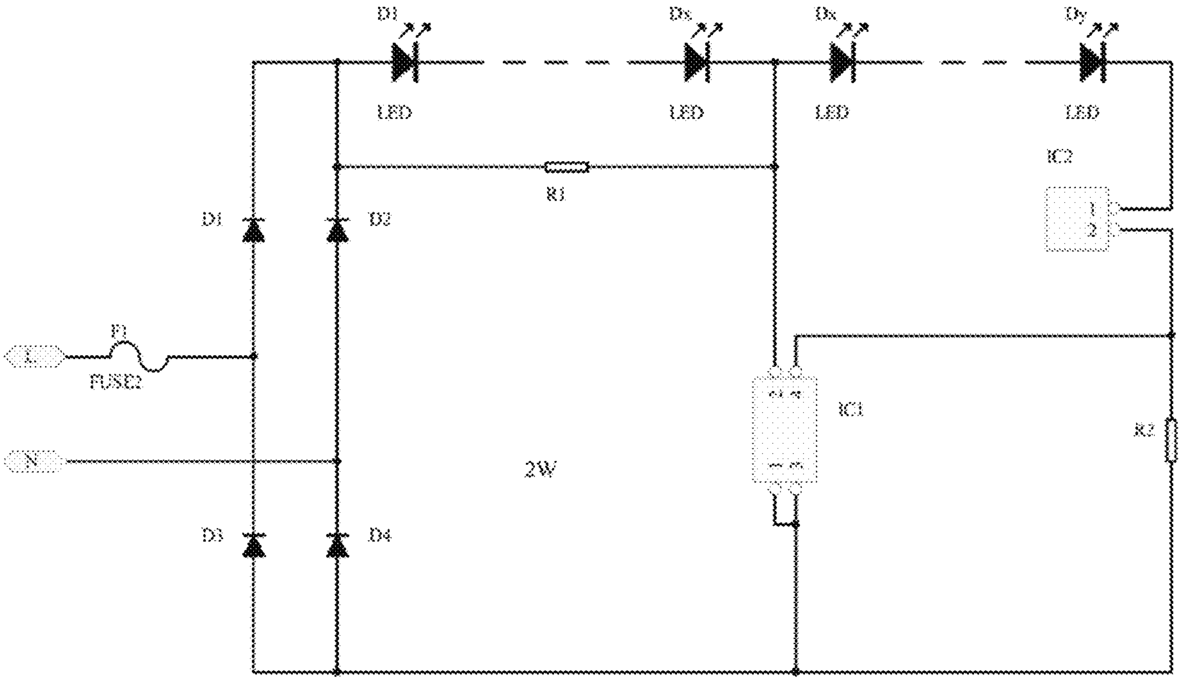

FIGS. 6A and 6B illustrate an exemplary PCB layout for an exemplary light emitting device according to embodiments, as well as an exemplary schematic for an exemplary light emitting device according to embodiments. In examples, the device illustrated in FIGS. 6A and 6B may comprise a luminous flux measurement of 175 lumens.

Figure 7A:
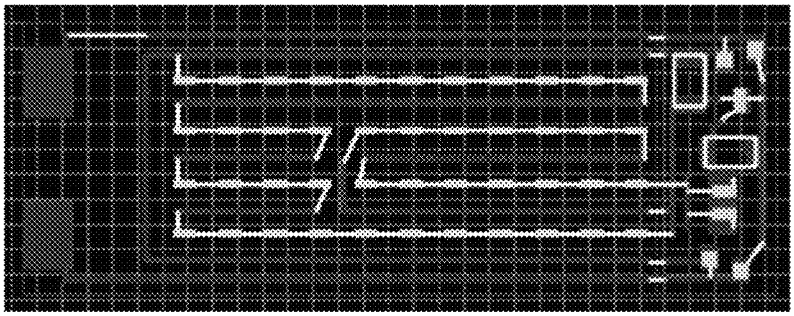
FIGS. 7A and 7B illustrate an exemplary PCB layout for an exemplary light emitting device according to embodiments, as well as an exemplary schematic for an exemplary light emitting device according to embodiments.
Figure 7B:
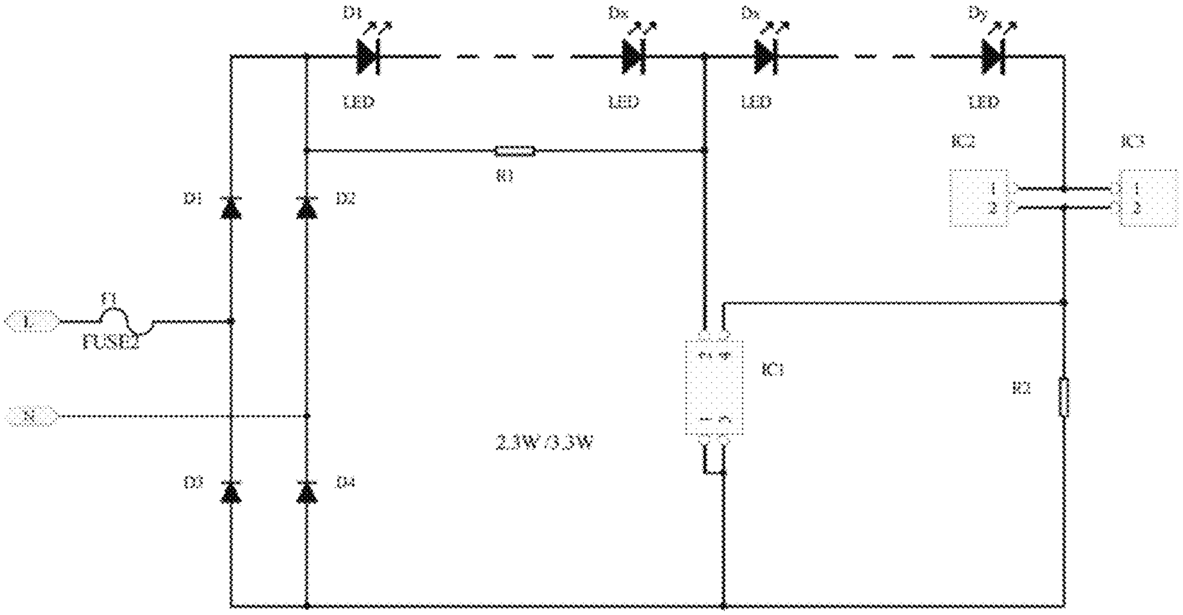

FIGS. 7A and 7B illustrate an exemplary PCB layout for an exemplary light emitting device according to embodiments, as well as an exemplary schematic for an exemplary light emitting device according to embodiments. In examples, the device illustrated in FIGS. 7A and 7B may comprise a luminous flux measurement of one of 225 lumens or 350 lumens.

Figure 8:
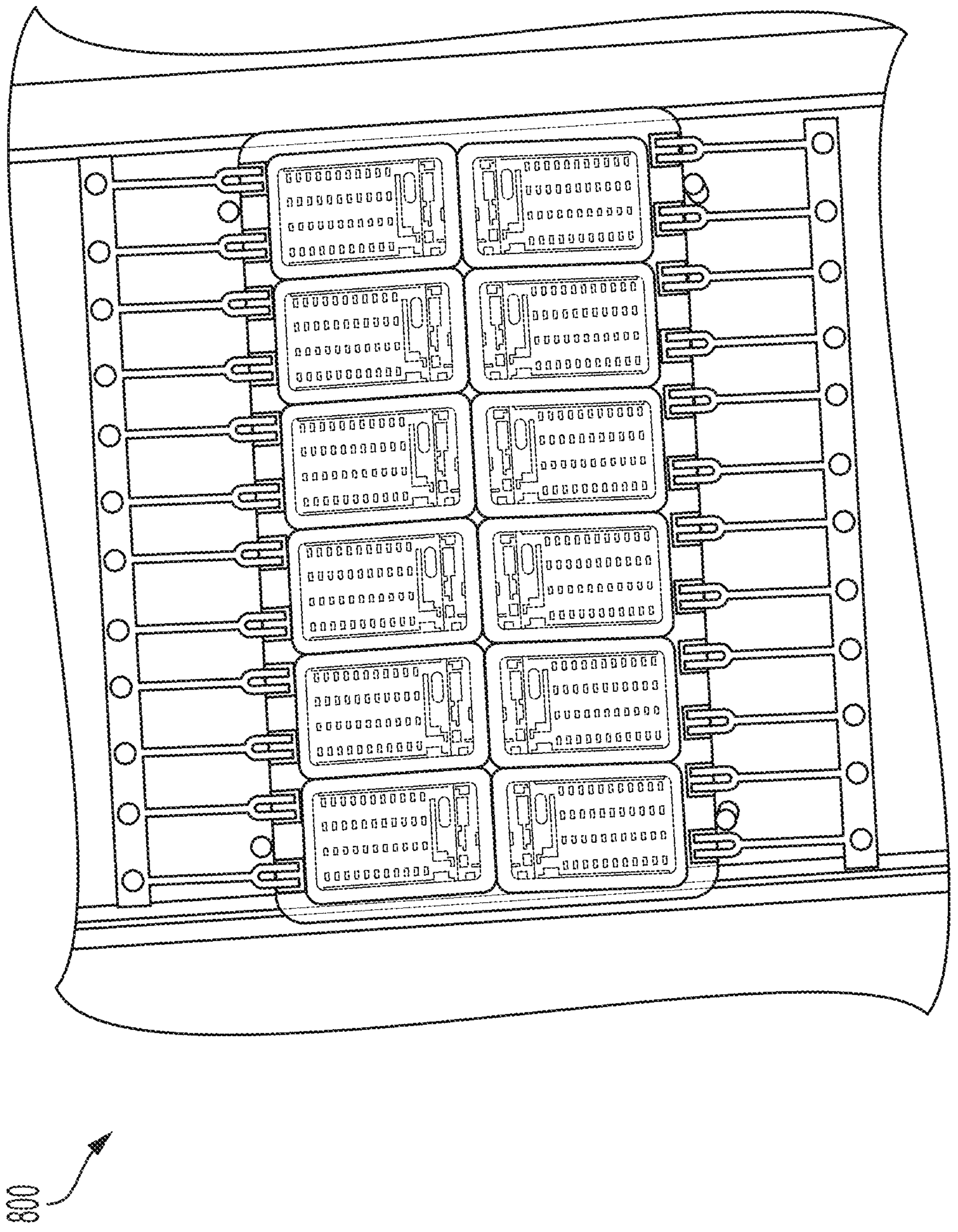
FIG. 8 illustrates an exemplary light emitting device for use with embodiments of the present disclosure.
Figure 9:
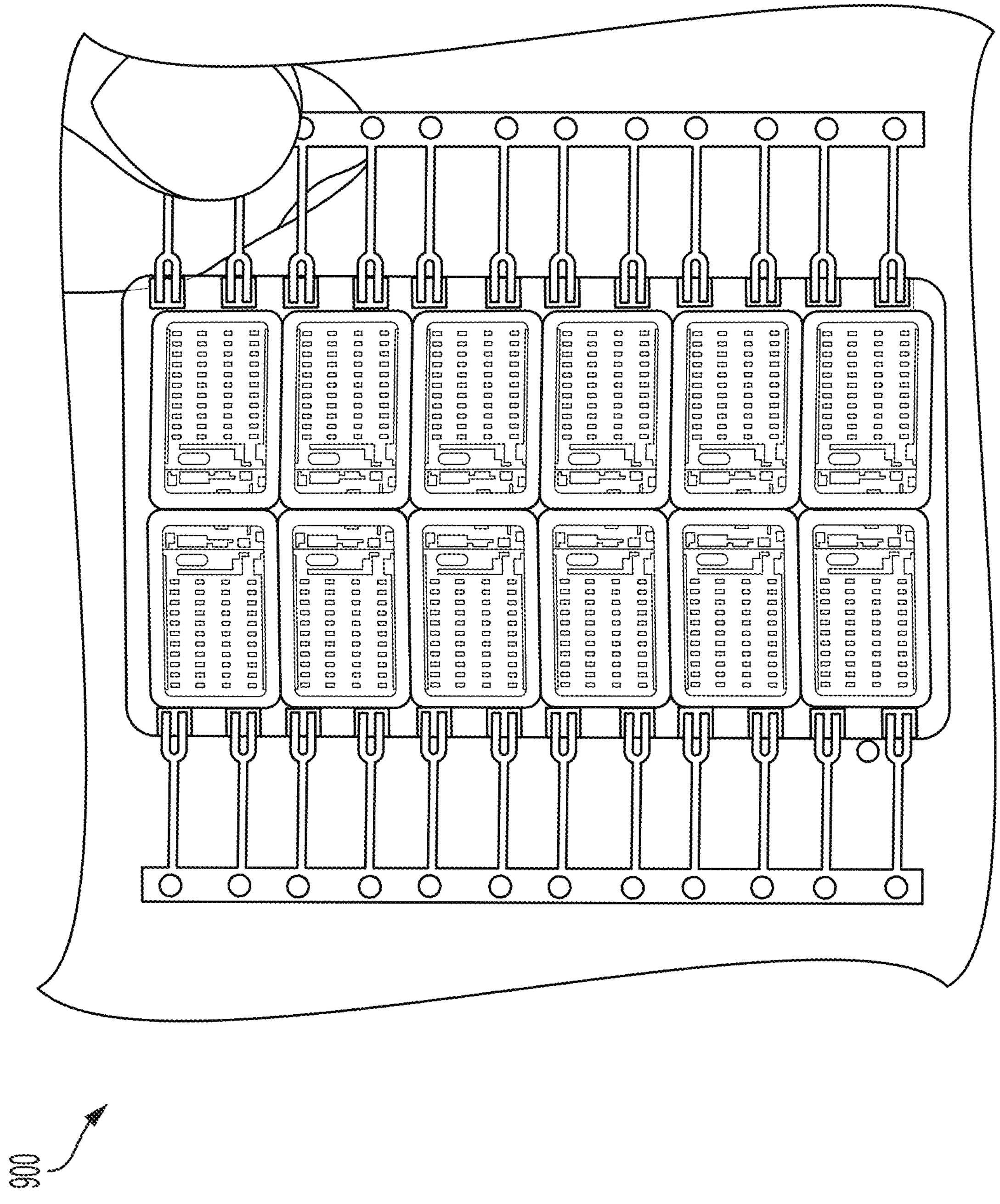
FIG. 9 illustrates an exemplary light emitting device for use with embodiments of the present disclosure.

FIGS. 8 and 9 illustrate exemplary light emitting devices 800, 900 for use with embodiments of the present disclosure.

The foregoing Detailed Description signifies in isolation the individual features, structures, functions, or characteristics described herein and any combination of two or more such features, structures, functions or characteristics, to the extent that such features, structures, functions or characteristics or combinations thereof are based on the present specification as a whole in light of the knowledge of a person skilled in the art, irrespective of whether such features, structures, functions or characteristics, or combinations thereof, solve any problems disclosed herein, and without limitation to the scope of the claims. When an embodiment of a claimed invention comprises a particular feature, structure, function or characteristic, it is within the knowledge of a person skilled in the art to use such feature, structure, function, or characteristic in connection with other embodiments whether or not explicitly described, for example, as a substitute for another feature, structure, function or characteristic.

In view of the foregoing Detailed Description it will be evident to a person skilled in the art that many variations may be made within the scope of innovations, embodiments and/or examples, such as function and arrangement of elements, described herein without departing from the principles described herein. One or more elements of an embodiment may be substituted for one or more elements in another embodiment, as will be apparent to those skilled in the art. The embodiments described herein are chosen to signify the principles of the invention and its useful application, thereby enabling others skilled in the art to understand how various embodiments and variations are suited to the particular uses signified.

The foregoing Detailed Description of innovations, embodiments, and/or examples of the claimed inventions has been provided for the purposes of illustration and description. It is not intended to be exhaustive nor to limit the claimed inventions to the precise forms described, but is to be accorded the widest scope consistent with the principles and features disclosed herein. Obviously, many variations will be recognized by a person skilled in this art. Without limitation, any and all equivalents described, signified or incorporated by reference in this patent application are specifically incorporated by reference into the description herein of the innovations, embodiments and/or examples. In addition, any and all variations described, signified or incorporated by reference herein with respect to any one embodiment are also to be considered taught with respect to all other embodiments. Any such variations include both currently known variations as well as future variations, for example any element used herein includes a future equivalent element that provides the same function, regardless of the structure of the future equivalent.

It is intended that the scope of the claimed inventions be defined and judged by the following claims and equivalents. The following claims are hereby incorporated into the Detailed Description, with each claim standing on its own as a separate embodiment. Disclosed embodiments can be described with more features than are expressly recited in the claims.

The invention claimed is:

1. A substrate assembly comprising:
- a first substrate having a first outward facing surface;
- a second substrate adjacent the first substrate and having driver circuitry attached to a second outward facing surface thereof, the second substrate having at least one of a size or a shape identical to that of the first substrate, and
- a wire connection electrically coupling the first substrate and the second substrate wherein:
  - one or more arrays of light emitting diodes are confined to the first outward facing surface, such that the second substrate is free of light emitting diodes; and
  - the driver circuitry drives the one or more arrays of light emitting diodes via the wire connection.

2. The substrate assembly of claim 1, further comprising a third substrate positioned intermediate the first and second substrate.

3. The substrate assembly of claim 1, further comprising an outer layer of phosphor outside the first outward facing surface of the first substrate and the second outward facing surface of the second substrate.

4. The substrate assembly of claim 1, wherein the assembly is mounted to a ceramic base.

5. The substrate assembly of claim 4, wherein the base is one or more of an Edison base, an E11 base, a G4 base, a G8 base, a G9 base, a Wedge base, a Bayonet base, or a DC Bayonet base.

6. The substrate assembly of claim 1, wherein the one or more arrays of light emitting diodes are configured for emitting light in one or more of a wall fixture, a step light, a mini pendant light, a decorative sconce light, a desk lamp, or an outdoor fixture.

7. The substrate assembly of claim 1, wherein the assembly is positioned within an enclosure that is one or more of transparent, clear, opaque, shatterproof, glass, or plastic.

8. The substrate assembly of claim 7, wherein the enclosure is filled with gas for cooling the LED arrays.

9. The substrate assembly of claim 1, further comprising a plurality of LED arrays attached to the first outward facing surface of the first substrate.

10. The substrate assembly of claim 2, wherein the third substrate comprises sapphire or ceramic material.

11. A method of manufacturing a substrate assembly, the method comprising:
- attaching one or more arrays of light emitting diodes to a first outward facing surface of a first substrate of the substrate assembly;
- attaching driver circuitry to a second outward facing surface of a second substrate of the substrate assembly, wherein the second substrate has at least one of size or a shape identical to that of the first substrate, and wherein the second substrate is free of light emitting diodes; and
- electrically coupling the first substrate and the second substrate with a wire connection such that the driver circuitry drives the one or more arrays of light emitting diodes via the wire connection.

12. The method of claim 11, further comprising the step of applying an outer layer of phosphor outside the first outward facing surface of the first substrate and the second outward facing surface of the second substrate.

13. The method of claim 11, further comprising the step of attaching a ceramic base to the substrate assembly.

14. The method of claim 11, further comprising attaching one or more of an Edison base, an E11 base, a G4 base, a G8 base, a G9 base, a Wedge base, a Bayonet base, or a DC Bayonet base to the substrate assembly.

15. The method of claim 11, further comprising the step of attaching an enclosure to the substrate assembly.

16. The method of claim 11, further comprising attaching a plurality of LED arrays to the first outward facing surface of the first substrate.

17. The method of claim 16, further comprising filling the enclosure with gas for cooling the LED arrays.

18. The method of claim 11, further comprising the step of positioning a third substrate intermediate the first and second substrates, wherein the third substrate comprises sapphire or ceramic material.

19. A method of manufacturing a substrate assembly, the method comprising:

attaching one or more arrays of light emitting diodes to a first outward facing surface of a first substrate of the substrate assembly;

attaching driver circuitry to a second outward facing surface of a second substrate of the substrate assembly, wherein the second substrate has at least one of size or a shape identical to that of the first substrate, and wherein the second substrate is free of light emitting diodes;

positioning a third substrate intermediate the first and second substrates; and electrically coupling the first substrate and the second substrate with a wire connection such that the driver circuitry drives the one or more arrays of light emitting diodes via the wire connection.

20. The method of claim 19, wherein the third substrate comprises sapphire or ceramic material.

* * * * *